(12) United States Patent
Ossher et al.

(10) Patent No.: US 9,898,310 B2
(45) Date of Patent: Feb. 20, 2018

(54) SYMMETRICAL DIMENSIONS IN CONTEXT-ORIENTED PROGRAMMING TO OPTIMIZE SOFTWARE OBJECT EXECUTION

(71) Applicant: INTERNATIONAL BUSINESS MACHINES CORPORATION, Armonk, NY (US)

(72) Inventors: Harold L. Ossher, South Salem, NY (US); David M. Ungar, Mountain View, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/503,064

(22) Filed: Sep. 30, 2014

(65) Prior Publication Data

US 2015/0106786 A1 Apr. 16, 2015

Related U.S. Application Data

(60) Provisional application No. 61/891,466, filed on Oct. 16, 2013.

(51) Int. Cl.
*G06F 9/44* (2006.01)
(52) U.S. Cl.
CPC .................. *G06F 9/4431* (2013.01)
(58) Field of Classification Search
CPC .................................................. G06F 9/4431
USPC ........................................................ 717/116
See application file for complete search history.

(56) References Cited

U.S. PATENT DOCUMENTS

| 7,051,322 B2* | 5/2006 | Rioux ........................... 717/143 |
| 7,925,611 B1* | 4/2011 | Bromley .............. G05B 19/409 706/11 |
| 8,533,687 B1* | 9/2013 | Greifeneder et al. ........ 717/130 |
| 2003/0149962 A1* | 8/2003 | Willis et al. ................... 717/135 |
| 2005/0015733 A1* | 1/2005 | Jones et al. ....................... 716/1 |

(Continued)

OTHER PUBLICATIONS

Agesen O. and Ungar, D. 1994. "Sifting Out the Gold", ACM, OOPSLA'94, pp. 1-16.

(Continued)

*Primary Examiner* — Li B Zhen
*Assistant Examiner* — Bradford Wheaton
(74) *Attorney, Agent, or Firm* — Law Office of Jim Boice

(57) ABSTRACT

A method, system, and/or computer program product optimizes execution of a computation. Multiple slots, each of which is a container for information, are defined. A coordinate tuple is defined for each of the multiple slots. The coordinate tuple describes a position of a slot along multiple dimensions in a slot space. The multiple dimensions describe roles for executing a software object, and each of the multiple dimensions has a same level of primacy such that no dimension has primacy over another dimension in the slot space. Multiple method slots are populated with software method objects that address different contexts and purposes as defined by coordinate tuples of the multiple method slots. Software method objects are retrieved from coordinate tuples in the slot space that match a defined context and purpose of a particular computation, which is propagated to a processor that is executing a particular software method object.

20 Claims, 12 Drawing Sheets

(56) References Cited

U.S. PATENT DOCUMENTS

| | | | | |
|---|---|---|---|---|
| 2007/0239508 | A1* | 10/2007 | Fazal | G06Q 10/0637 705/7.36 |
| 2010/0023919 | A1* | 1/2010 | Chaar | G06Q 10/06 717/101 |
| 2010/0318900 | A1* | 12/2010 | Racic | G06F 17/241 715/243 |
| 2012/0192143 | A1* | 7/2012 | Elaasar | G06F 8/74 717/104 |
| 2015/0084975 | A1* | 3/2015 | Heinrich et al. | 345/552 |

OTHER PUBLICATIONS

Appeltauer, M. et al. 2009. "A Comparison of Context-oriented Programming Languages", ACM, COP'09, pp. 1-6.

Ashcroft, E. A. and Wadge, W. W. "Lucid, a Non-procedural Language with Iteration", 1977. CACM. 20, 7, pp. 519-526.

Batory, D. et al. 1994. "The GenVoca Model of Software-System Generators", IEEE Software. 11, 5. pp. 89-94. (Abstract Only).

Bezanson, J. et al. 2014. "Julia Language Documentation", The Julia Manual. http://docs.julialang.org/en/release-0.2/manual/, pp. 1-261.

Bobrow, D. G. and Gabriel, R. P. "CLOS in Context: The Shape of the Design Space", May 2004, www.dreamsongs.com/CLOS.html, pp. 1-34.

Chambers, C. 1992. "Object-Oriented Multi-Methods in Cecil", ECOOP'92, pp. 1-24.

Chung, W. et al. 2005. "The Concern Manipulation Environment", IEEE, ICSE'05, pp. 666-667. (Abstract Only).

Chung, W. et al. 2005. "Working with Implicit Concerns in the Concern Manipulation Environment", AOSD'05 Workshop on LATE, pp. 1-5.

Faustini, A. A. and Jagannathan, R. 1993. "Multidimensional Problem Solving in Lucid", Computer Science Laboratory, SRI-CSL-93-03. SRI International, pp. 1-16.

Gabriel, R. et al. 1991. "CLOS: Integrating object oriented and functional programming", CACM, 34, 9, pp. 1-20.

Harrison, W. et al. 2005. "Supporting aspect-oriented software development with the Concern Manipulation Environment", IBM Systems Journal. 44, 2, pp. 309-318. (Abstract Only).

Heinlein, C. 2005. "Global and Local Virtual Functions in C++", Journal of Object Technology, vol. 4, No. 10, pp. 71-93.

Harrison, W. and Ossher, H. 1993. "Subject-Oriented Programming: A Critique of Pure Objects", ACM, OOPSLA'93,pp. 1-20.

Hanson, D. R. and Proegsting, T. A. 2000. "Dynamic Variables", Microsoft Research Technical Report MSR-TR-2000-109, pp. 1-12.

Kiczales, G. et al. 1997. "Aspect-Oriented Programming", Springer-Verlag, ECOOP'97, pp. 1-25.

Kiczales, G. et al. 2001. "An Overview of AspectJ", Springer-Verlag, ECOOP'01, pp. 327-353.

Löwis, M. et al. 2007. "Context-Oriented Programming: Beyond Layers", ACM, ICDL'07, pp. 143-156.

Moon, D. 1986. "Object-Oriented Programming with Flavors", ACM, OOPSLA'86, vol. 21, No. 11, pp. 1-8. (Abstract Only).

Lewis, J. R. et al. "Implicit Parameters: Dynamic Scoping with Static Types", ACM, POPL'00, pp. 108-118.

Ossher, H. et al. 1996. "Specifying subject-oriented composition", TAPOS, 2, 3, pp. 179-202. (Abstract Only).

Ostermann, K. 2002. "Dynamically Composable Collaborations with Delegation Layers", ECOOP'02, Lecture Notes in Computer Science, vol. 2374, pp. 89-110.

Ossher, H. and Tarr, P. 2000. "Hyper/J: multi-dimensional separation of concerns for Java", ACM, ICSE'00, pp. 734-737. (Abstract Only).

Pirkelbauer, P. et al. 2007. "Open Multi-Methods for C++", ACM, GIPCE'07, pp. 1-11.

Plaice, J. and Paquet, J. 1996. "Introduction to intensional programming", Proceedings of the Intensional Programming I. World Scientific, Singapore, pp. 1-14.

Prehofer, C. 1997. "Feature-oriented programming: A fresh look at objects", ECOOP'97, Lecture Notes in Computer Science, vol. 1241, pp. 419-443.

Salzman, L. and Aldrich, J. 2005. "Prototypes with multiple dispatch: An expressive and dynamic object model", ECOOP'05, Lecture Notes in Computer Science, vol. 3586, pp. 312-336.

Scharli, N. et al. "Traits: Composable Units of Behavior", CSE 02-012, Dept. of Computer Science and Engineering, Oregon Health & Science University, Nov. 25, 2002, pp. 1-25.

Stavrakas, Y. and Gergatsoulis, M. 2002. "Multidimensional Semistructured Data: Representing Context-Dependent Information on the Web", CAISE'02, Lecture Notes in Computer Science, vol. 2348, pp. 183-199. (Abstract Only).

Smith, R. B., Ungar, D. 1996. "A Simple and Unifying Approach to Subjective Objects", TAPOS, 18, 4, pp. 161-178. (Abstract Only).

Tarr, P. et al. 1999. "N degrees of separation: multi-dimensional separation of concerns", ACM, ICSE'99, pp. 107-119.

Ungar, D. and Adams, S. 2010. "Harnessing Emergence for Manycore Programming: Early Experience Integrating Ensembles, Adverbs, and Object-based Inheritance", ACM, OOPSLA'10 Short Paper, pp. 19-26.

Ungar, D. and Smith, R. B. 1987. "Self: The Power of Simplicity", ACM, OOPSLA'87, pp. 227-241.

Wan, K. et al. 2005. "A Context Theory for Intensional Programming", CRR'05 Workshop on Context Representation and Reasoning, pp. 1-12.

Wu, A. et al. 2009. "Object-Oriented Intensional Programming: Intensional Classes Using Java and Lucid", Software Engineering Research & Applications'10, pp. 1-27.

Hirschfeld, R. et al. 2008. "Context-oriented Programming", Journal of Object Technology, vol. 7, No. 3, pp. 125-151.

Elrad, T., et al. "Discussing Aspects of AOP", Communications of ACM, 2001, 44, pp. 33-38. (Abstract Only).

Miller, M. et al., "Paradigm Regained: Abstraction Mechanisms for Access Control", Springer-Verlag, 2003, HPL-2003-222, pp. 1-22.

Anonymous, "E (programming language)", Wikimedia Foundation, Inc., wikipedia.org, retrieved Sep. 26, 2014, pp. 1-4.

Anonymous, "IEEE floating point", Wikimedia Foundation, Inc., wikipedia.org, retrieved Sep. 26, 2014, pp. 1-12.

Harrison, W. et al. 2005. "Supporting aspect-oriented software development with the Concern Manipulation Environment", IBM Systems Journal. 44, 2, pp. 309-318.

Moon, D. 1986. "Object-Oriented Programming with Flavors", ACM, OOPSLA'86, vol. 21, No. 11, pp. 1-8.

Ossher, H. and Tarr, P. 2000. "Hyper/J: multi-dimensional separation of concerns for Java", ACM, ICSE'00, pp. 734-737.

Stavrakas, Y. and Gergatsoulis, M. 2002. "Multidimensional Semistructured Data: Representing Context-Dependent Information on the Web", CAISE'02, Lecture Notes in Computer Science, vol. 2348, pp. 183-199.

Smith, R. B., Ungar, D. 1996. "A Simple and Unifying Approach to Subjective Objects", TAPOS, 18, 4, pp. 161-178.

Batory, D. et al. 1994. "The GenVoca Model of Software-System Generators", IEEE Software. 11, 5. pp. 89-94.

Chung, W. et al. 2005. "The Concern Manipulation Environment", IEEE, ICSE'05, pp. 666-667.

Ossher, H. et al. 1996. "Specifying subject-oriented composition", TAPOS, 2, 3, pp. 179-202.

Elrad, T., et al. "Discussing Aspects of AOP", Communications of ACM, 2001, 44, pp. 33-38.

* cited by examiner

```
// (coord for) prototype parent, with method slots def {}
stackParent = newCoord;
method { rcvr ≤ stackParent } pop() { sp = sp - 1;
return contents[sp];

}
method { rcvr ≤ stackParent } push(x) {
    contents[sp] = x;
    sp = sp + 1;

}
method { rcvr ≤ stackParent } copy() {

... 0
}
// (coord for) prototype, with data slots
def {} stack = newCoord extending stackParent;
var { rcvr ≤ stack } sp = 0;
var { rcvr ≤ stack } contents = array.copy();
```

FIG. 6

```
method {} main() {
        var stack1 = stack.copy();
        var stack2 = stack.copy();

stack1.push(100);
     // -same as- {rcvr: stack1}.push(100);

stack2.push(200);
     var sum = stack1.pop() + stack1.pop(); // Oops!
}
main(); // Results in negative sp!
```

FIG. 7

```
method { rcvr ≤ stackParent, assertions ≤ true } pop() { if ( sp ≤ 0 )
error("Invariant violated: sp must be > 0"); else
return {assertions: false}.pop();
// -or- return {-assertions}.pop();

}

{assertions: true}.main(); // Results in error msg
```

FIG. 8

SYMMETRICAL DIMENSIONS IN CONTEXT-ORIENTED PROGRAMMING TO OPTIMIZE SOFTWARE OBJECT EXECUTION

RELATED APPLICATION

The present application claims the benefit of U.S. provisional patent application 61/891,466, filed Oct. 16, 2013, the entire content and disclosure of which is incorporated herein by reference.

BACKGROUND

The present disclosure relates to the field of computers, and specifically to the use of software objects in computers. Still more particularly, the present disclosure relates to the use of software objects that include both data and functions.

SUMMARY

In one or more embodiments of the present invention, a method, system, and/or computer program product optimizes execution of a computation. Multiple slots, each of which is a container for information, are defined. A coordinate tuple is defined for each of the multiple slots. The coordinate tuple describes a position of a slot along multiple dimensions in a slot space. The multiple dimensions describe roles for executing a software object, and each of the multiple dimensions has a same level of primacy such that no dimension has primacy over another dimension in the slot space. Multiple method slots are populated with software method objects that address different contexts and purposes as defined by coordinate tuples of the multiple method slots. Software method objects are retrieved from coordinate tuples in the slot space that match a defined context and purpose of a particular computation, which is propagated to a processor that is executing a particular software method object.

BRIEF DESCRIPTION OF THE SEVERAL VIEWS OF THE DRAWINGS

FIG. 6-FIG. 8 present illustrative simple stack examples that introduce basic Korz concepts and terminology.

DETAILED DESCRIPTION

Figure 1:
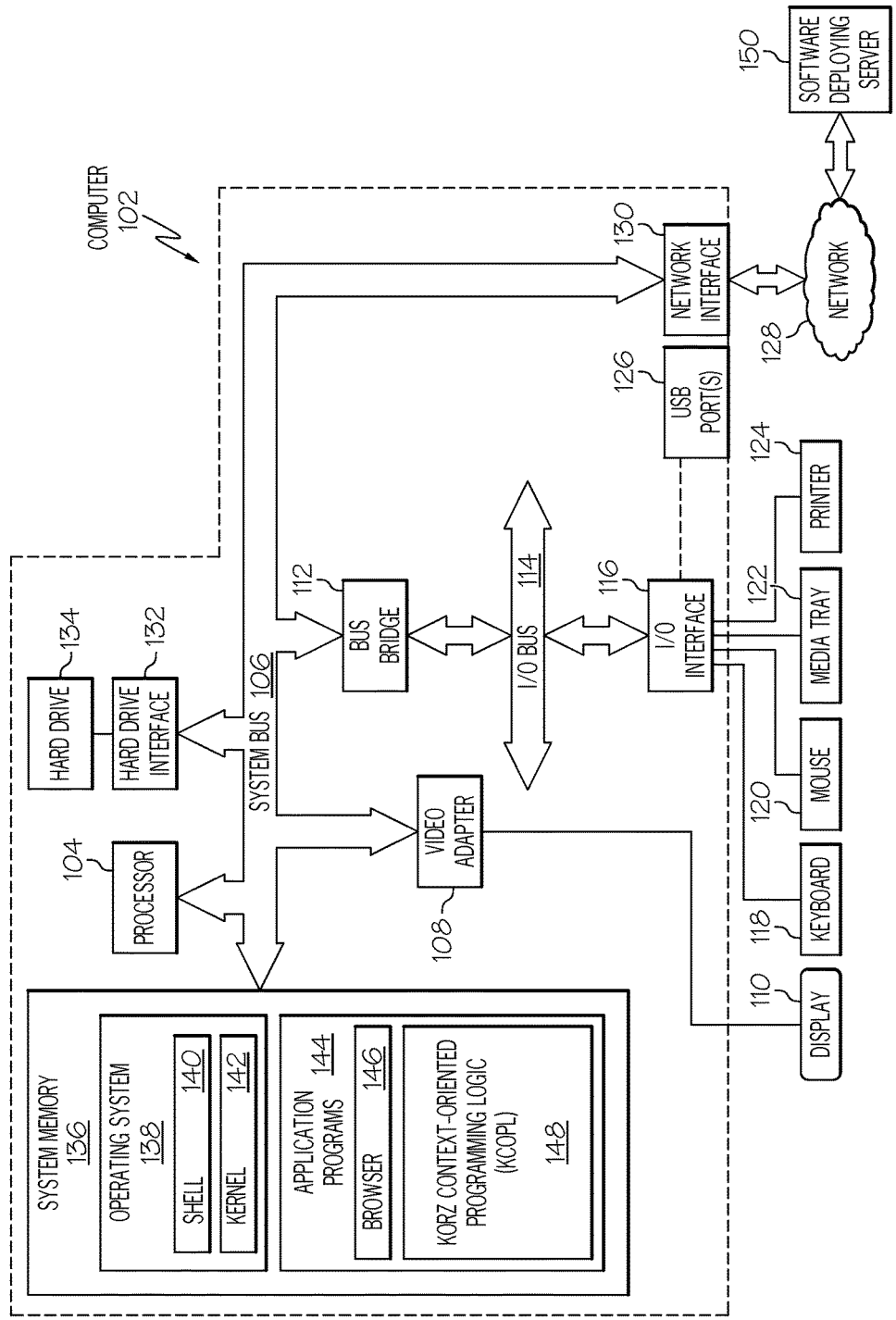
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Korz Context-Oriented Programming Logic (KCOPL) 148. KCOPL 148 includes code for implementing the processes described below, including those described in FIGS. 2-12. In one embodiment, computer 102 is able to download KCOPL 148 from software deploying server 150, including in an on-demand basis, wherein the code in KCOPL 148 is not downloaded until needed for execution. Note further that, in one embodiment of the present invention, software deploying server 150 performs all of the functions associated with the present invention (including execution of KCOPL 148), thus freeing computer 102 from having to use its own internal computing resources to execute KCOPL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

1. INTRODUCTION TO "KORZ"

Presented herein is a new computational model, which for ease of description is referred to herein as "Korz". "Korz" is used as a tribute to Alfred Korzybski, the nineteenth/twentieth century scholar in the field of general semantics. While the name "Korz" is not to be construed as limiting the present invention to the work of Alfred Korzybski or any other person, living or dead, the term "Korz" is used herein as a shorthand name for the context-oriented programming described herein, including but not limited to those features that that combine implicit arguments and multiple dispatch in a slot-based model. This synthesis enables the writing of software that supports contextual variation along multiple dimensions, and graceful evolution of that software to support new, unexpected dimensions of variability, without the need for additional mechanism such as layers or aspects. With Korz, a system consists of a sea of method and data slots in a multidimensional space. There is no fixed organization of slots into objects. A slot pertains to a number of objects instead of being contained by a single object, and slots can come together according to the implicit context in any given situation, yielding subjective objects. There is no dominant decomposition, and no dimension holds sway over any other. Interactive development environment (IDE) support is useful for managing complexity when working with the slot space and with subjectivity, allowing the task at hand to dictate what subspaces to isolate and what dominance of dimensions to use when presenting nested views to the user.

With the Korz computational model, a system consists of a sea of slots (containing data values or methods), organized in a multidimensional slot space. Computation occurs in a context, which is also multidimensional, binding specific values to some or all of the dimensions in the slot space. At each computation step, a slot is selected from the space, using multiple dispatch that is based on the context, a selector, and the explicit arguments, and then that slot is evaluated. The context is implicitly passed along to serve as a set of implicit arguments in nested method executions.

As described herein, Korz presents a unique and novel combination of multiple dispatches that support multiple dimensions of variation, implicit arguments that support evolution and contextual programming, and a slot-based metaphor that allows for subjective gathering of slots into different "objects" for different situations. Together, these components allow a program to be easily extended to accommodate multiple variations and perspectives.

In one embodiment, a prototype Korz implementation uses the Self (slot-based) language, virtual machine and environment, and includes an interpreter, debugger, and a partial interactive development environment (IDE). In a preferred embodiment of the present invention, the syntax used for Korz is based on Self syntax; however, to enhance the readability of examples in the present disclosure, examples are presented in a Java(Script)-like syntax.

2. OVERVIEW OF KORZ CONCEPTS

Figure 2:
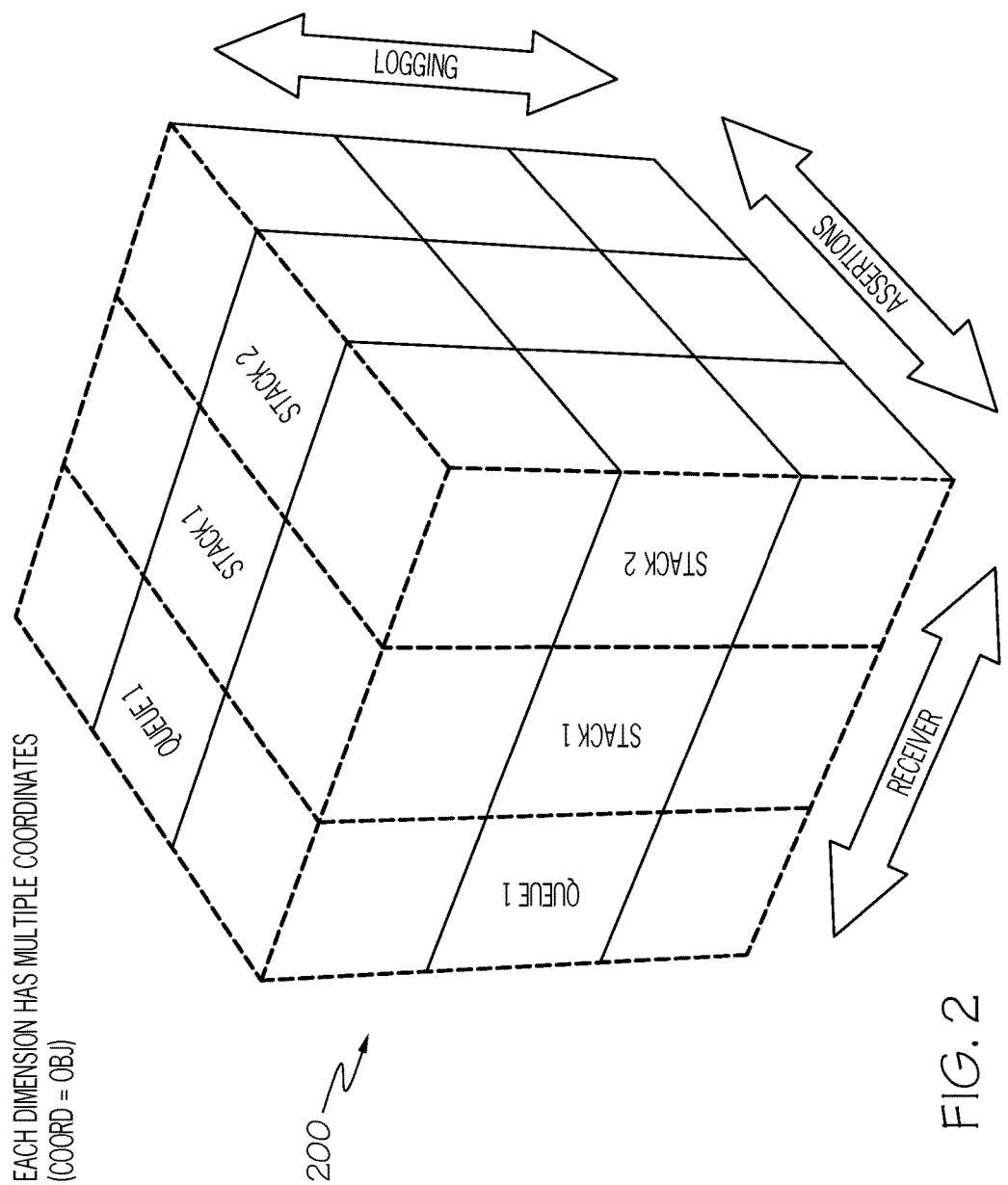
FIG. 2-FIG. 5 illustrate dimensional coordinate tuples in a Korz environment.
Figure 3:
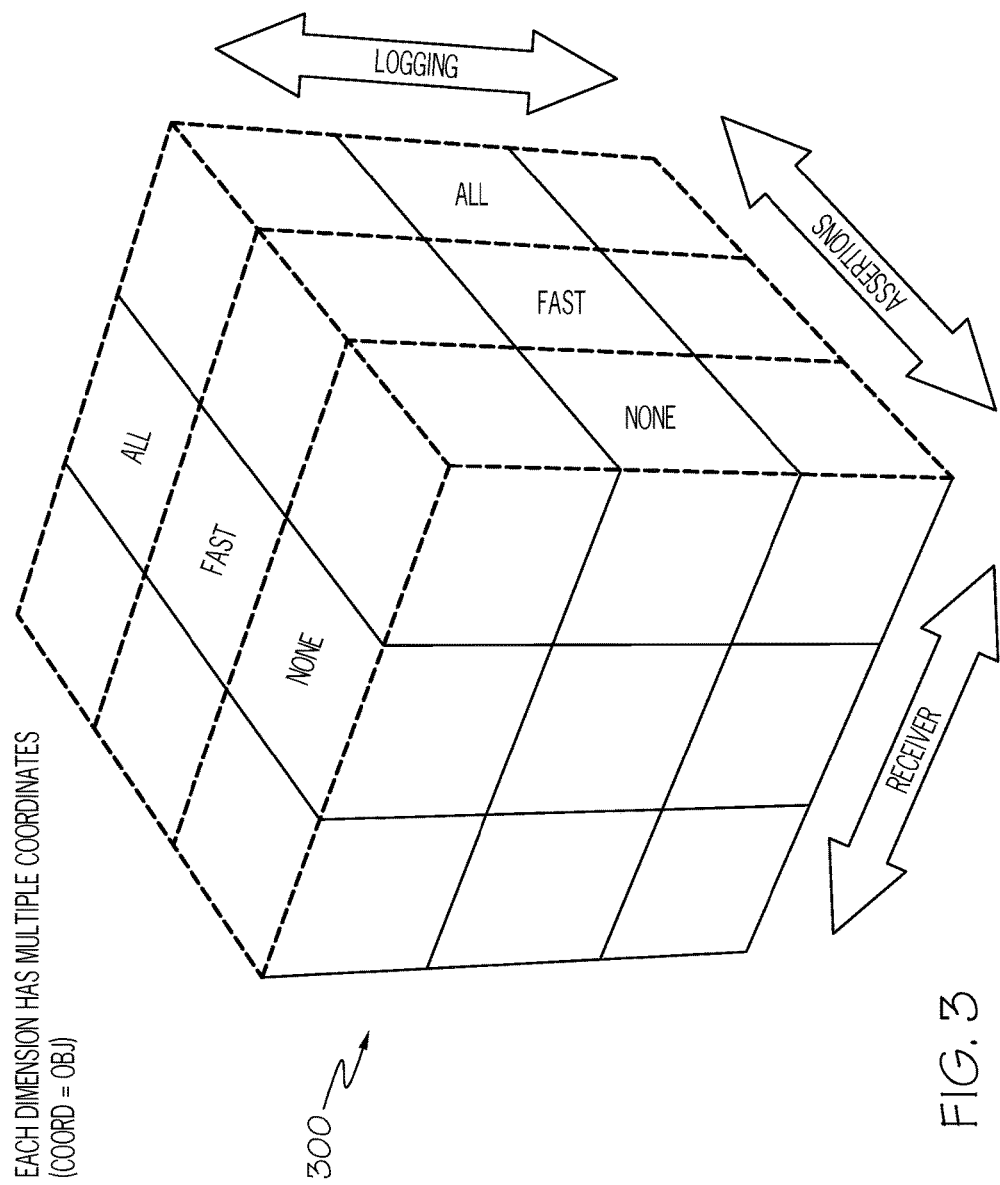
Figure 4:
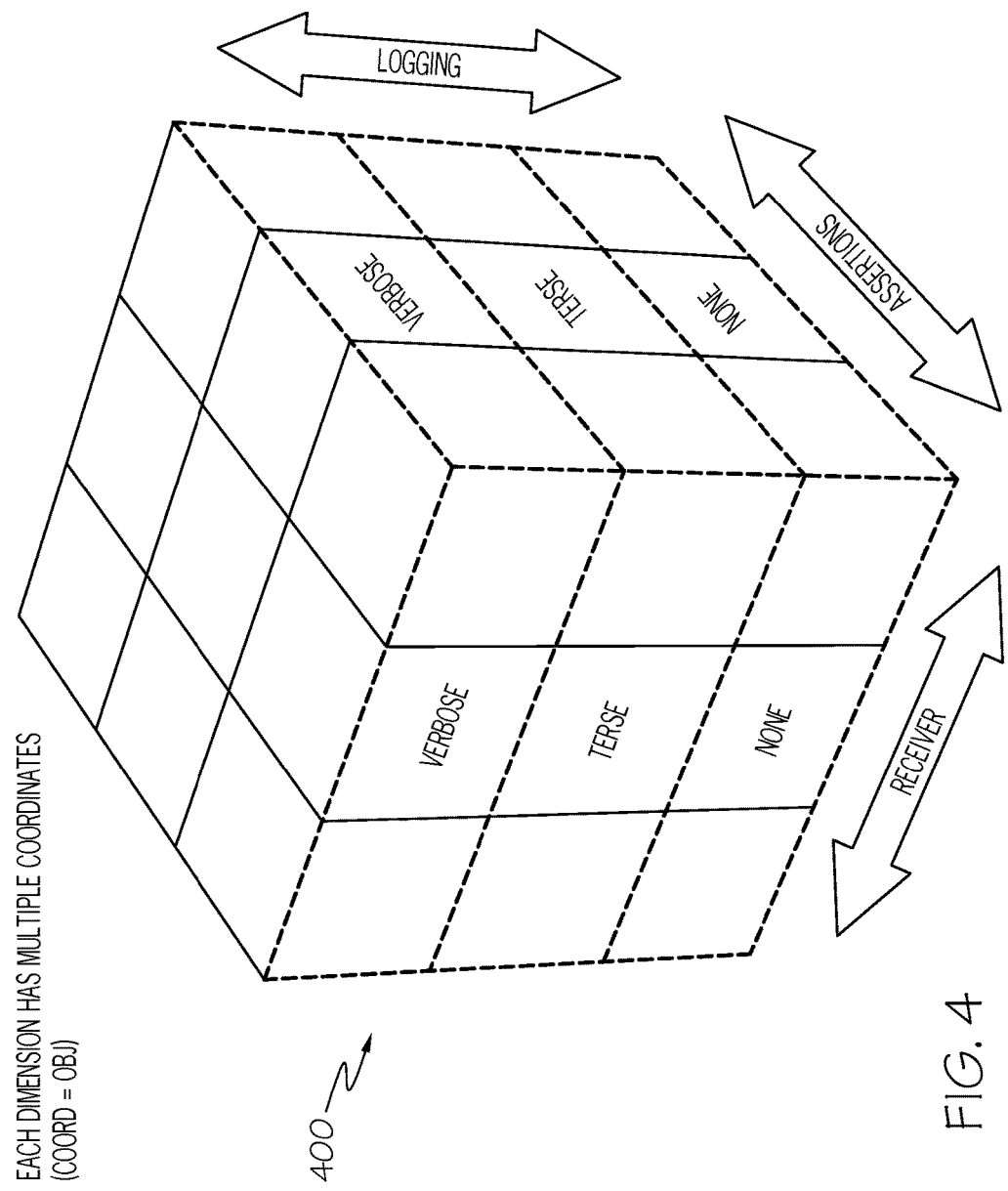

FIG. 2-FIG. 4 present illustrative simple stack examples that introduce basic Korz concepts and terminology. The stack implementation evolves to include a variant with assertion checking, and the particular collection of slots seen by any given caller depends on its particular implicit context. This brief example illustrates fundamental Korz mechanisms, rather than exemplifying realistic Korz usage; the example is too simple to actually utilize all of the advantageous features of Korz, or any of a number of other advanced formalisms. A more comprehensive example of the use of Korz is presented below after the present section defines and describes the language Korz and its implementation.

Korz adopts the radical stance of altering the fundamental language-level notion of object. In place of an object that constitutes identity as well as a set of slots, Korz has a coordinate that is solely a value that constitutes an identity; and a slot that pertains to a number of coordinates, known as a coordinate tuple (i.e., multiple coordinates, each applying to a different dimension), as indicated by part of its slot guard. The slot guard also includes a selector and a list of explicit positional parameters. A slot guard indicates the applicability of a slot, which in one or more embodiments of the present invention must be matched by information contained in a message that requests a slot. A message sent in Korz occurs in a context consisting of a number of coordinates, each in a particular role (or "along a dimension"). The context, selector, and explicit positional arguments of the message send determine the slot to which the message applies.

As described herein, Korz utilizes slots, coordinates, coordinate tuples, and dimensions. As a high-level overview of Korz (which is described in further detail herein), a slot is a container that holds either a coordinate or a method or other data. A coordinate is an immutable value that serves as an identity, including but not limited to the identity of a slot or dimension. A coordinate tuple is a set of multiple coordinates, each applying to a different dimension. A dimension is a role, a kind of organization, or a variation thereof (e.g., a description of an entity that describes attributes of that entity). When tied together, then: slots are organized in a space with multiple dimensions; the positions along dimensions are coordinates and the coordinates (in the slot's guard—described further below) indicate the slot's position in the space. Examples of coordinates include but are not limited to: that referred to by the literal 0; the contents of the constant slots true and stack-Parent; and the contents of the variable slot stack1. In some instances, a coordinate itself has no content (it does not contain anything), but it can be the contents of a slot (since slots do have contents). Examples of usage of roles include, but are not limited to, roles that describe the "receiver" object ("rcvr"k); how much assertion checking is to be performed ("assertions"); how much logging is to occur in a program ("logging"), which version of code is to be used ("codeVersion"); and on whose behalf the code is being run ("user").

A slot can visually be conceptualized as sub-cubes in a "Rubik's Cube". For example, consider the multi-dimensional space depicted as multi-cubes 200-400 in FIGS. 2-4. Each of the sub-cubes in these multi-cubes 200-400 represents a slot. In multi-cube 200 in FIG. 2, the dimension of the role "receiver" is highlighted. In the multi-cube 300 in FIG. 3, the dimension of the role "assertions" (i.e., conditions that must be met during code execution) is highlighted. In the multi-cube 400 in FIG. 4, the dimension of the role "logging" (i.e., what level of logging is to be provided during code execution) is highlighted. A "coordinate tuple" is thus a combination of each dimension in the multi-cubes depicted in FIGS. 2-4. For example, the coordinate tuple of the front, right, top sub-cube in any of the depicted multi-cubes 200-400 would be "receiver:stack2" (from FIG. 2); "assertion none" (from FIG. 3); and "logging verbose" (from FIG. 4). Thus, a coordinate tuple that is a coordinate triple (in the case of a three-dimensional space) would be {receiver:stack2, assertion none, logging verbose}.

In some embodiments of the present invention, more than three-dimensions can be used to define the slot space. According to the present invention, the dimensions that are implemented utilize slots that are context-based. That is, a slot is defined according to the dimensions used for its coordinate tuple. Thus, the user of different dimensions alters the coordinate tuple (and thus context) of the slot, thereby creating a unique slot for each coordinate tuple.

Figure 5:
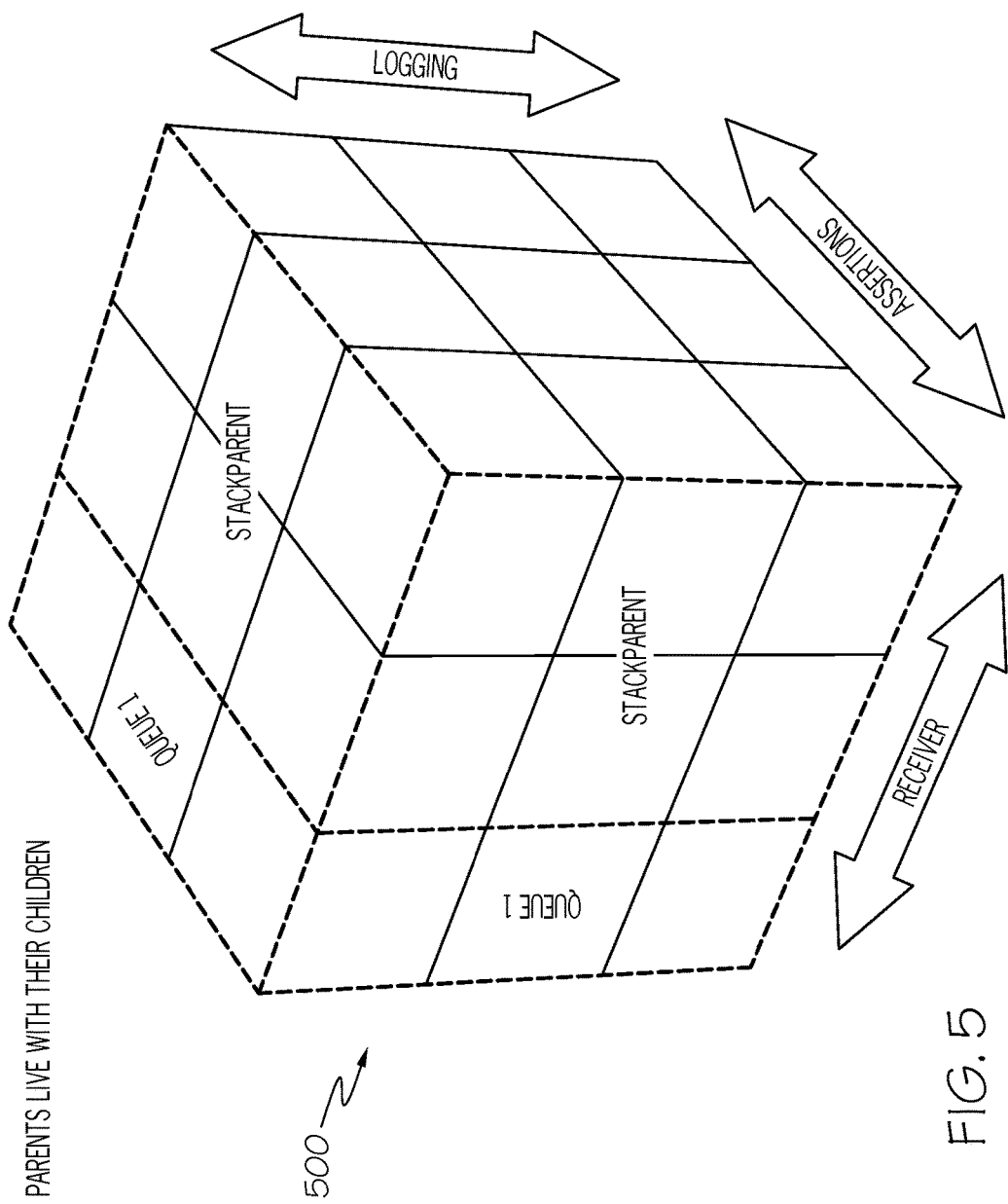

As depicted in the multi-cube 500 in FIG. 5, note that slots can inherit properties from parent slots. That is, slots such those found in Queue 1 can inherit properties from the parent slots in the depicted slots in Stackparent. Thus, multi-cube 500 shows a combination of both parent and child slots (e.g., all "stack" slots) within a same dimension.

Consider now a simple stack example using Korz, as shown in FIG. 6-FIG. 8. The push/pop/stack procedure shown in FIG. 6-FIG. 8 is not a requisite of Korz, but rather is an illustrative example of the use of Korz.

In FIG. 8, an example of a slot guard is: {rcvr≤stackParent, assertions≤true} pop( ), which indicates that the method being defined is contained in a slot with selector pop, has no explicit positional parameters, and pertains to coordinate stackParent (which we say is "in the role of" rcvr, or "along the dimension" rcvr) and coordinate true (along the assertions dimension); that is, the slot is constrained to only be accessible from contexts in which the coordinate in the rcvr dimension is stackParent, or a descendant thereof, and the coordinate in the assertions dimension is true (and any other dimensions of the context are irrelevant to the accessibility of this slot).

In FIG. 7, the command to push the value "100" onto a stack identified as "stack1" is represented by {rcvr: stack1}.push(100). Thus, the code depicted in FIG. 7 exemplifies a message send which is represented by {rcvr: stack1}.push(100). The context for the message send will include the coordinate stack1 in the rcvr dimension, and depending on the chain of sends leading up to this send, the context might also implicitly include a coordinate in the assertions dimension: true or possibly false. In some circumstances (discussed in subsequent sections), syntactic sugar can reduce the code for this message send to stack1.push(100). The context, selector and explicit arguments of the message send are all used to find an appropriate slot in the slot space, such that the slot whose slot guard best matches the components of the message send is deemed to be the appropriate slot. The dispatch algorithm is discussed in detail in the next section. The appropriate slot is then evaluated, and a coordinate is returned. The message send {rcvr: stack1}.push(100) in FIG. 7 results in the push method slot of FIG. 6 being evaluated, because rcvr: stack1 matches rcvr≤stackParent from the slot guard by virtue of the fact that stack1 is a copy of stack, which extends stackParent, as well as the fact that the selectors are the same and the arguments (100) match the parameters (x).

In the body of an invoked method, a coordinate from the context can be accessed using its role or dimension name. For example, in the push method evaluation discussed above, rcvr can be used in an expression within the body of push to access the coordinate from stack1. Thus, in effect, the context constitutes a set of implicit arguments.

In Korz, new things can be created by expanding the slot space, as in stack1=stack.copy( ) in FIG. 7. The copy method would create a new coordinate and a number of slots pertaining to it, and would return the new coordinate.

FIG. 6 presents code for a simple stack example. The code in FIG. 6 begins by creating a coordinate for method slots that will be inherited by the stack prototype and by all stacks cloned from that prototype. The coordinate is contained in the constant slot stack-Parent, and because the slot guard for stackParent (which is contained in braces) is empty, that slot is globally accessible; that is, the stackParent slot is not constrained at all with respect to the contexts from which it is accessible, so it is accessible from any context. Pop, push, and copy methods are then defined, and placed in slots with corresponding names, with slot guards that indicate that they pertain to stackParent in the rcvr dimension. That is, messages sent with a context that includes the coordinate stackParent in the rcvr dimension, or any coordinate descended from stackParent, as well as an appropriate selector and argument list, will match these methods (regardless of any additional dimension-coordinate pairs in the context). In keeping with the JavaScript-like syntax, the examples include '( )' after invocations of methods like pop and copy that have no explicit arguments, even though Korz unifies state and behavior so that even variables become subjective, and such empty parentheses are optional.

The code in FIG. 6 then creates a coordinate for data slots that constitute the prototype for a stack. That coordinate is contained in the constant slot stack, with an empty slot guard. Finally, the code in FIG. 6 defines sp (i.e., the stack pointer indicating a position on a stack) and contents data slots pertaining to stack.

FIG. 7 contains a globally-accessible main method that calls all other methods needed to run an application. In FIG. 7, this main method is depicted as main( ). The invocation of main( ) begins by copying from the stack prototype twice, and storing the resulting new coordinates in the variable slots stack1 and stack2, which are local to the main( ) method. The code in FIG. 7 then sends a message with a context that includes stack1 in the rcvr dimension, the selector push, and the argument 100. As was discussed above, the push method in FIG. 6 is invoked by virtue of inheritance, with x bound to 100 and rcvr bound to stack1. By virtue of syntactic sugar involving the rcvr dimension being implicit, references such as sp and contents in fact access the data slots pertaining to stack1. For example, sp=sp+1 in this invocation of push is equivalent to {rcvr: stack1}.sp={rcvr: stack1}.sp+1. The second push in FIG. 7 proceeds similarly, but for stack2. The final line of the main( ) method erroneously pops stack1 twice; and popping an empty stack leads to a negative stack pointer and program failure.

FIG. 8 shows code that could simply be added to the present invention to evolve it by defining an assertion-checking variant of the pop method, as well as code that invokes the existing main method with assertions: true so that the assertion-checking variant of pop is used instead of the original pop method. This results in the attempted invariant violation being detected and prevented and an error message being issued. The key to this example is that message sends for which the context does not include a coordinate for the assertions dimension, or includes the coordinate false for the assertions dimension, will see the original pop( ) method; whereas message sends in which the context includes the coordinate true for the assertions dimension will see the assertion-checking pop( ) method, which either detects a violation and issues an error message, or alters the context to instead include the coordinate false in the assertions dimension (or this could have been written to remove the binding of the assertions dimension entirely) and then sends a pop( ) message, resulting in the original pop method in FIG. 6 then being invoked. Assertions, such as "true" in the context of sending the main message, is implicitly carried through the main method into the assertion-checking pop method. Thus, methods such as "main( )" do not need to be aware of new dimensions such as assertions, and do not need to deal with them in any explicit way.

Thus, Korz deconstructs the notion of object, and recasts program structure within a multidimensional framework.

Coordinate inheritance along each of a number of dimensions is supported. With Korz, the notion of a single object as the receiver of a message is replaced with a context for the message, consisting of zero or more dimension-coordinate pairs, which are used together with the selector and arguments to determine the slot to be evaluated. A given dimension-coordinate pair may be specified explicitly as part of the message send, or it may have been previously set and implicitly carried along a sequence of message sends/method invocations. These concepts are defined and explained in the next section.

3. LANGUAGE DEFINITION

A body of Korz code is termed a slot space, which is defined as a collection of slots organized in a multidimensional space. Execution occurs when an expression is evaluated relative to the slot space. Expression evaluation usually involves sending messages. Each message send occurs in an implicit context (comprised of implicit arguments) and specifies a selector and explicit arguments. The context, selector and arguments (three kinds of bindings) are all used to find an appropriate slot in the slot space, by finding the slot whose slot guard (consisting of corresponding constraints) best matches the bindings. If a most-suitable slot is found, it is then evaluated to yield the result of the message send.

Presented below in Section 3.1 is an abstract syntax for Korz slot spaces. Described below in Section 3.2 are the semantics of the interpreter. Both descriptions are semi-formal, with the intent of combining precision and readability.

3.1 Abstract Syntax

The abstract syntax described here should be thought of as the representation used by the interpreter rather than a representation close to any concrete syntax. It is illustrated using the simple stack example in Section 2 above, using the concrete syntax from that stack example.

3.1.1 Slot Space

A Korz slot space is a tuple SS=(C, p, D, L, S) where:
C is a set of coordinates,
p is a parent relation on coordinates,
D is a set of dimension names,
L is a set of selectors, and
S is a set of slots.
Each slot consists of:
A slot guard, sg=(dcs, l, pct), where:
 dcs is a dimension constraint set, made up of dimension constraints (which are context/implicit parameter constraints)
 l is a selector
 pct is a parameter constraint tuple, made up of parameter constraints
Contents, which can be:
 A coordinate, or
 The special assignment primitive, or
 A method body, which consists of:
  0 or more local variable declarations, and
  An expression, usually a sequence of sub-expressions, which can be message sends or various other forms.

In this exposition, whenever there are tuples in the abstract syntax, the component names are used as the names of functions providing access to the components. Thus for SS above, C(SS) denotes the coordinate set of SS, p(SS) denotes its parent relation, etc.

Each of these elements, and their sub-elements, are now described in more detail. The exposition is done mostly bottom-up, and the map above puts the elements in context.

3.1.2 Coordinates

C is a set of coordinates. A coordinate c from the set of coordinates C is an immutable value that serves as an identity. Examples of coordinates from Section 2 discussed above are: the literal 0, and the contents of the constant slot true and of the variable slot stack1.

Given two coordinates, one can determine whether or not they are in fact the same coordinate, i.e., whether c1=c2. Some coordinates may be numbers, characters or strings, denoted by literals in the usual way. One special coordinate, denoted by any, is always in C. Any is never explicitly written, and is discussed in further detail below. Other coordinates are created on demand by the coordinate creation primitive (denoted newCoord in the concrete syntax used in the stack example). This primitive is an expression but not a literal. Each time it is used, a new coordinate is created that is guaranteed not to be the same as any other coordinate.

In Korz, coordinates differ from object IDs/pointers found in pure object-oriented programming languages (OOPLs). In an OOPL, every value refers to some object; in Korz, every value is some coordinate. In an OOPL, once an object is created, there may be no textual expression denoting it; in Korz, once a coordinate is created, there may be no textual expression denoting it. In an OOPL, object1 or aCar is used when writing about an object; the identifiers denote variables containing object references. In Korz, coordinate1 or aCar is used when writing about a coordinate; the identifiers denote variables containing coordinates.

3.1.3 Parents and Ancestors

Korz supports inheritance through the parent relation on coordinates, p: C×C→{T, F}, where T and F are the Boolean values. If p(c1, c2)=T, then c2 is said to be a parent of c1. In FIG. 6-FIG. 8 discussed above in Section 2, stackParent is the parent of stack. By definition, any is the parent of exactly those coordinates that have no other parents.

The reflexive, transitive closure of the parent relation induces a partial order of generality/specificity:

$c_1 \leqslant c_2 \equiv c_1 = c_2 p(c_1, c_2)$ $\exists c' \in C$ such that $c_1 \leqslant c' \wedge c' \leqslant c_2$ The partial order relation '$\leqslant$' can be read 'is at most as general as' or 'is at least as specific as,' and is analogous to the subtyping relations found in many languages. Like a subtyping relation, '$\leqslant$' is partial because two coordinates may be unrelated by parentage, with neither being at least as specific as the other. However, every coordinate is at least as specific as any:

$\forall c \in C: c \leqslant any$

The generality/specificity partial order relation will be extended to composite structures involving coordinates. In all cases, equality can be defined in the usual way:

$x = y \equiv x \leqslant y \wedge y \leqslant x$ 3.1.4 Identifiers and Dimension Names An identifier is a sequence of a restricted set of characters. Examples of identifiers from Section 2 are: sp, pop, push and x. Identifiers can be compared for equality, and are used for variable and parameter names and the like. A Korz slot space includes a set, D, of identifiers used as dimension names, and hence defining the dimensional structure of the slot space. Examples of dimension names from Section 2 are: rcvr and assertions.

3.1.5 Selectors

L is a set of selectors. A selector is a sequence of characters used in a message to indicate the desired action, including method invocation, variable access, and variable assignment. Selectors can be compared for equality.

Korz selectors are just like those in other languages. In object-oriented languages in the C family, selectors are method names (identifiers), and sometimes operator symbols (C++). Smalltalk and Self use identifiers for unary selectors, operator symbols for binary operators and sequences of one or more colon-terminated identifiers for keyword selectors.

In the simple stack example, identifiers are used for selectors. Examples from Section 2 are: pop and push.

3.1.6 Context: Dimension Binding Set

Each step of Korz execution consists of evaluating an expression in a context, which is a set of dimension bindings that are passed implicitly with invocations. A dimension binding is a pair, db=(dim, coord), where dim D is a dimension name, and coord C is a coordinate. The coordinate specifies a binding for that dimension: a particular position on the dimension. A given coordinate can be used in more than one dimension. For example, one can have true being bound to a number of different dimensions.

A dimension binding set, dbs={$db_1$, $db_2$, &, $db_n$} is a set of 0 or more dimension bindings, containing at most one dimension binding per dimension of the slot space. Not all dimensions in the slot space need be mentioned in dbs; any dimension not mentioned is considered irrelevant. A context is a dimension binding set.

3.1.7 Argument Tuple

In addition to implicitly passed arguments as the values of dimensions in the context, Korz supports explicitly passed positional arguments. An argument tuple, args=($arg_1$, $arg_2$, &, $arg_n$) is a tuple of 0 or more arguments, each argument being an expression (defined below).

3.1.8 Dimension Constraints

A slot space includes dimension constraints that will participate in slot selection (below) by constraining the set of acceptable coordinates that may be bound to a specific dimension. A dimension constraint is a pair, dc=(dim, coord), where dim D is a dimension name and coord C is a coordinate. The coordinate specifies a particular position on the dimension. Examples of dimension constraints from Section 2 are: rcvr≼stack and assertions≼true.

A dimension constraint means that the coordinate bound to the dimension is constrained to be at least as specific as the coordinate specified in the constraint (i.e., the same as the coordinate in the constraint, or more specific than the coordinate in the constraint). Wherever a dimension constraint is needed, a dimension name alone may be written, omitting the coordinate. In that case the coordinate is understood to be any.

A dimension constraint can be tested to see if it is at least as specific as another dimension constraint:

dc≼dc'≡dim(dc)=dim(dc')∧ coord(dc)≼coord(dc')

A dimension constraint set, dcs={$dc_1$, $dc_2$, &, $dc_n$}, is a set of 0 or more dimension constraints, containing at most one dimension constraint per dimension of the slot space. When informal, context constraint is used as a synonym for dimension constraint set.

A dimension binding (Section 3.1.6) can be tested to see if it satisfies ('⊑') a dimension constraint:

db⊑dc≡dim(db)=dim(dc)∧ coord(db)≼coord(dc)

A dimension binding set satisfies a dimension constraint set if every constraint is satisfied by one of the bindings:
dbs⊑dcs ≡∀dc∈dcs∃db∈dbs such that db⊑dc The binding set may include bindings for additional dimensions; since these dimensions are absent from the constraint set, they are considered unconstrained and hence irrelevant to this satisfaction relation.

A dimension constraint set is at least as specific as another dimension constraint set if it has extra dimensions or, in the case of equal dimensions, its coordinates are at least as specific. Inheritance in the matching dimensions does not matter in the case where one dimension constraint set has additional dimensions. In other words, additional dimensions trump inheritance, which is why line 3 below does not test for specificity:

| | |
|---|---|
| dcs ≼ dcs' ≡ | |
| 1. | \|dcs\| > \|dcs'\| ∧ |
| 2. | ∀ dc' ∈ dcs' ∃ dc ∈ dcs such that |
| 3. | dim(dc) = dim(dc') |
| 4. | ∨ |
| 5. | \|dcs\| = \|dcs'\| ∧ |
| 6. | ∀ dc' ∈ dcs' ∃ dc ∈ dcs such that dc ≼ dc' |

The implications of having additional dimensions trump inheritance are discussed further in Section 4.7 below.

3.1.9 Parameter Constraints

A method slot that requires positional arguments will declare (and optionally constrain) the corresponding formal parameters with parameter constraints. A parameter constraint is a pair, pc=(param-name, coord), where param-name is the parameter name, which is an identifier, and coord C is a coordinate, which constrains the corresponding argument to be at least as specific as coord. Coord may be any, declaring but not constraining the parameter. In a concrete syntax, the coordinate is likely to be omitted in this unconstrained case, as was done in Section 2.

A parameter constraint is thus similar to a dimension constraint, but constrains the value of an argument rather than a dimension, and the declaration is used to declare an explicitly passed formal parameter, rather than an implicitly-passed value for a dimension in the context.

A parameter constraint tuple pct=($pc_1$, $pc_2$, &, $pc_m$) is an ordered tuple of 0 or more parameter constraints. The ith parameter constraint of a parameter constraint tuple, pct, is denoted by pci(pct). The arity of a parameter constraint tuple pct, denoted by |pct|, is the number of parameter constraints in the parameter constraint tuple. Informally, 'parameter guard' may be used for 'parameter constraint tuple'.

For example, the method below includes a single parameter constraint, named x:
method { } push(x≼number); // x must be a number.

Arguments may be tested for satisfaction against parameter constraints. An argument tuple satisfies a parameter constraint tuple if they have equal arity and every argument is at least as specific as the corresponding constraint:

args⊑pc t≡|args|=|pct|∧

∀i∈[1,|args|]: argsi≼coord(pci(pct))

Parameter constraint tuples may be compared for specificity. They require equal arity to be comparable, since methods with different numbers of parameters can never match the same message:

$pct \lesssim pct' \equiv$
1. $\quad |pct| = |pct'| \wedge$
2. $\quad \forall\ i \in [\ 1, |pct|\ ]:$
3. $\quad\quad coord(pci(pct)) \lesssim coord(pci(pct'))$ Since parameters are passed positionally, the param-names play no part in specificity; they are used only to provide access to the argument values within the method body.

3.1.10 Slot Guards

A slot guard specifies the conditions for a slot to match a specific message, and hence be a candidate for evaluation in response to that message. The matching depends on three factors: the implicit context in which the message is sent (a dimension binding set), the selector used in the message, which indicates the desired action, and the explicit arguments (actual parameters) provided as part of the message. Accordingly, a slot guard, sg=(dcs, l, pct), is a triple consisting of a dimension constraint set dcs, a selector l∈L and a parameter constraint tuple pct.

Slot guards may be compared for specificity:

$sg \lesssim sg' = dcs(sg) \lesssim dcs(sg') \wedge$ $l(sg)=l(sg') \wedge$ $pct(sg) \lesssim pct(sg')$ Slot guards with different selectors are incomparable. Examples of slot guards from Section 2 are:
{rcvr≤stackParent} push(x)
and
{rcvr≤stackParent, assertions≤true} pop( ).

3.1.11 Slot

A slot s is a pair, such that s=(sg, contents), where sg is a slot guard. No two slots in a slot space may have equal slot guards (slot guards all of whose components are equal, ignoring parameter names). Contents may be one of:

A coordinate, in which case the slot is a data slot.

The assignment primitive, in which case the slot is an assignment slot. In this case the parameter guard must specify a single parameter (to hold the value to be assigned), and the assignment slot must be paired with a data slot (thus forming a getter/setter pair). This pairing might be done using selector conventions, such as 'x' for a data slot and 'x:' or 'setX' for the corresponding assignment slot. A message sent to the assignment slot sets the value of the corresponding data slot.

A method body (defined below), in which case the slot is a method slot.

Examples of slot declarations from Section 2 are: var {rcvr≤stack} sp=0;
and
method {rcvr≤stackParent} pop( ){ . . . }.

The var in this syntax declares both sp as a data slot and also a corresponding assignment slot that is invoked by assignment expressions like 'sp=0.' The method indicates that pop is a method slot.

3.1.12 Method Body

A method body is a pair (vars, exp), where vars is a sequence of 0 or more local variable declarations, and exp is an expression (usually consisting of a sequence of sub-expressions). A local variable declaration is a pair (name, value), where name is an identifier and value is an expression specifying the initial value. In a concrete syntax, the value can be omitted, and is then taken to be the literal nil.

3.1.13 Expression

An expression is a literal, a coordinate creation primitive, a message send, a block declaration, or a sequence of (sub-)expressions. A variable reference is written as an identifier, which is actually a parameterless message send whose effect is to return the coordinate contained in the variable. As in Self, this unification of variable access and message send is important to achieving unification of state and behavior. In Korz, it enables variable access and assignment to depend on context in just the same way as method invocation.

3.1.14 Dimension Modifier Set

In order to execute a sub-expression with a different set of dimension bindings (i.e. in a different context) than is used for its enclosing expression, in one embodiment of the present invention a dimension modifier set is used. A dimension modifier set, dms={$dm_1$, $dm_2$, &, $dm_n$} is a set of dimension modifiers, containing at most one dimension modifier per dimension of the slot space. A dimension modifier is a pair dm=(dim, e), where dim∈D is a dimension name and e is either an expression, which evaluates to a coordinate; or the symbol '-', which indicates that any existing binding to the associated dimension should be removed. Examples of dimension modifier sets from Section 2 are: {assertions: true} and {-assertions}.

A dimension modifier contains an expression, which is evaluated when the modifier is used, whereas a dimension binding or dimension constraint contains a coordinate, which requires no evaluation.

3.1.15 Message Send

A message send is a triple m=(dms, l, args), where dms is a dimension modifier set, l∈L is a selector, and args=($arg_1$, $arg_2$, . . . , $arg_n$) is an argument tuple. A message send is evaluated relative to a dimension binding set (i.e., in a context). The dimension modifier set serves to specify how the incoming dimension binding set (a.k.a. incoming context) should be modified to obtain the evaluation dimension binding set (a.k.a. evaluation context), which is used to find and evaluate the appropriate slot. Examples of message sends from Section 2 are:
stack1.push(2)
which is syntactic sugar for {rcvr: stack1}.push(2) and
{-assertions}.pop( ).

In the latter example, regardless of any binding for assertions in the incoming dimension binding set, the evaluation dimension binding set would include no binding for assertions.

3.2 Semantics 3.2.1 Execution

A Korz execution request is a triple (dbs, e, SS), where dbs is a dimension binding set (a.k.a. a context), e is an expression and SS is a slot space. Such a request corresponds to a top-level invocation, such as from a read-eval-print loop or IDE. In response to the request, the expression e is evaluated in the context of dimension binding set dbs, using SS to find any slots involved in the evaluation. The result of the execution is the value of the expression e.

3.2.2 Expression Evaluation

Evaluation of an expression returns a value, which is a coordinate. Since it always occurs relative to a dimension binding set (i.e., in a context) and uses slots in a slot space, expression evaluation is defined by the function val(dbs, e, SS), where dbs is a dimension binding set, e an expression, and SS a slot space.

If e is a literal, val(dbs, e, SS) is the value of the coordinate denoted by the literal; dbs and SS are irrelevant.

If e is the coordinate creation primitive, val(dbs, e, SS) is a new, unique coordinate, which is added to C(SS) as a side-effect; again, the dimension binding set is irrelevant.

If e is a sequence of expressions, (e1, e2, . . . , en), each expression is evaluated in sequence: vi=val(dbs, ei, SS). The value of the expression as a whole is the value of the last one, vn.

If e is a message send m=(dms, l, args), then evaluation involves finding an appropriate slot in SS, and evaluating it, which is a four-step process:

val(dbs, (dms, l, args), SS)=
1. args'=val(dbs, args, SS);
2. dbs'=modifyDimBindings(dbs, dms, SS);
3. s=lookup(dbs', l, args', SS);
4. return val(dbs, args, s, SS)

Step 1 evaluates each argument expression to produce a tuple of coordinates. Step 2 applies the dimension binding modifier to the incoming dimension binding set to obtain the evaluation dimension binding set (concepts which were introduced above). Step 3 finds the unique slot to evaluate; this might fail, in which case an error occurs. The error can be handled in various ways, such as bringing up the debugger. Step 4 evaluates the slot, and returns the result as the value of the message send.

3.2.3 Dimension Binding Modification

An exemplary set of code for modifying dimension binding (i.e., setting dimension values) is:

modifyDimBindings(dbs, dms, SS)=
1. dbs'=dbs;
2. for each dimension modifier dm in dms:
3. if ∃db∈dbs' such that dim(db)=dim(dm),
4. remove db from dbs';
5. if e(dm) is not '-',
6. add db=(dim(dm),val(dbs, e(dm), SS)) to dbs'.

3.2.4 Slot Lookup

Slot lookup involves attempting to find a single, most specific slot whose guard matches the message:

lookup(dbs, l, args, SS)=
1. m={s S(SS)|matches(sg(s), dbs, l, args, SS)};
2. m'=removeLessSpecific(m, SS);
3. if |m'|=1, return the member of m';
4. if |m'|=0, error 'Not understood';
5. if |m'|>1, error 'Ambiguous'

3.2.5 Slot Guard Matching

Slot guard matching requires matching of the selectors, and satisfaction of the constraints:

matches(sg, dbs, l, args, SS)≡
1. dbs ⊑ dcs(sg) ∧
2. l=l(sg) ∧
3. args ⊑ pcs(sg)

3.2.6 Slot Specificity

Once all matching slots have been found, slots that are less specific than other matching slots can be removed, using code such as:

removeLessSpecific(m, SS)=
1. for each slot s∈m:
2. if ∃s'≠s m such that sg(s) ≾ sg(s'),
3. remove s' from m In the code just presented, the operator '≾' is used to describe the relationship between sg(s) and sg(s'). However, no two slots in SS can have equal slot guards, so in actual execution, sg(s) will be less than sg(s').

3.2.7 Slot Evaluation

If the contents of a slot is a coordinate, that is its value. That is, contents of a slot may be a method, data, and/or a coordinate.

In an embodiment of the present invention, the contents of a slot is the assignment primitive, the contents of the corresponding data slot is replaced with the value of the first and only argument, arg1, and the new contents is the returned value.

If the contents of a slot is a method body, then an activation is created to constrain the scope of local variables, the dimension binding set (context) is updated to record the activation, and then the expression is evaluated:

val(dbs', args', s, SS)=
1. a=createActivation(dbs', args', s);
2. dbs"=activation-dbs(a, dbs');
3. return val(dbs", expression(contents(s)), SS)

The createActivation function creates a coordinate to represent the activation, and creates data slots associated with it in the 'activation' dimension to enable variable access. For each formal parameter, p, in the slot guard, a (constant) data slot is created with selector param-name(p) and value the positionally-corresponding argument value. For each dimension constraint in the slot guard, a (constant) data slot is created with selector the dimension name and value taken from the dimension binding for that dimension. This slot enables the value bound to a dimension in the context to be accessed in the method body using the dimension name. For each local variable declared in the method body, a data slot pair (including an assignment slot) is created with selector the variable name and value the value of the initialization expression. The slot guards for all these data slots include all of the dimension constraints for the method slot plus a constraint pairing the activation dimension with the activation coordinate.

In the activation-dbs function, the dimension binding set, dbs', is then enhanced with a binding of the activation coordinate to the 'activation' implied dimension.

Finally, the expression in the method body is evaluated to yield the value of the slot. This evaluation occurs with 'activation' dimension bound to the activation coordinate mentioned above, so messages whose selectors are parameter, dimension or local variable names will access slots set up by createActivation, yielding the expected results.

4. EXAMPLES

Below are examples of the present invention that illustrates how Korz can support context dependence, evolution, symmetry and subjectivity according to the present invention. To avoid confusion, the examples below use coordinate only in its Korz language sense, and use position to talk about where things display on a screen.

4.1 Make a Point

An example according to the present invention, begins with a Cartesian, colored point. First the program defines Korz coordinates for the prototypical point (from which new points will be cloned) and its parent (with which methods applicable to all points will be associated).

To make the coordinates accessible, the program defines them as the contents of slots. The code below therefore creates two slots, each containing a new coordinate. The point coordinate is declared to have the pointParent coordinate as its parent:

def { } pointParent=newCoord;
def { } point=newCoord extending pointParent;

The empty slot guard "{ }" for point means that, in any context, the point message will result in evaluation of the slot just defined and return of the point coordinate (provided point is not overridden).

Now the program creates three assignable data slots associated with the prototypical point coordinate in the rcvr dimension (in other words, the implicit argument named rcvr;):

var {rcvr≤point} x;
var {rcvr≤point} y;
var {rcvr≤point} color;

The slot guards, {rcvr≤point}, specify that the slots are accessible only in contexts in which the rcvr dimension is bound to a point, i.e., to a coordinate that is at least as specific as the point coordinate. For example, the message {rcvr: point}.color (which can be sugared as point.color) will return the prototypical point's color.

This example needs a method to make a point:

```
method { } makeAPoint(x, y, c) {
    var x, y, c, p;
    p = point.copy;
    p.x = x; p.y = y; p.color = c;
    return p;
}
```

The point.copy method creates a new coordinate whose parent is the same as point's, i.e., pointParent. (Recall that copy and copy( ) are equivalent.)

4.2 Add a Method to Display a Point

The following code describes operations for performing a method declaration. The code defines a slot guard, a selector and method body, and a method that displays a point on a display:

```
method {
    rcvr ≤ pointParent,
    device //dimension required but can be anything
}
display {
    device.drawPixel(x, y, color)
};
```

In the exemplary code just presented, the guard mentions the device dimension without specifying a coordinate. This construct has two related effects:

First, any dimension mentioned in the guard must be present in the message context in order for the slot to be found. In this case, if there is no such dimension in the message context, this display slot will not be found.

Second, as defined in Section 3.2.7, every dimension occurring in a method slot's guard is placed into the scope of the method, so that the dimension identifier can be used within the method as a reference to that dimension's coordinate from the incoming context.

Consequently, if the message context has a dimension named device, this slot can be found, and the coordinate that is bound to the device dimension becomes bound to 'device' and will be used for displaying.

4.3 Add a Screen Object that can Draw Pixels

The example needs a screen object to use as the device coordinate. The screen thus can utilize the following drawPixel method:

```
def { } screenParent = newCoord;
def { } screen = newCoord extending screenParent;
method {rcvr ≤ screenParent) drawPixel(x, y, color) {
    // draw the pixel in the color
}
```

The present example leaves the device dimension unconstrained in order to illustrate the capability of utilizing various devices.

4.4 Drawing a Point and More Complicated Figures

In the scenario in which p1 is a point, and s is a screen (a coordinate at least as specific as screenParent), the display can be defined by code such as:

{rcvr: p1, device: s}.display

In one embodiment using Korz, the following code presents instructions for generating figures that contain many (e.g. three) points:

```
def { } FigureParent = newCoord
def { } Figure = newCoord extending FigureParent;
var {rcvr ≤ Figure} point1;
var {rcvr ≤ Figure} point2;
var {rcvr ≤ Figure} point3;
method {rcvr ≤ FigureParent} display {
    point1.display; point2.display; point3.display
}
```

If f1 is such a figure and s is a screen, this will work: {rcvr:f1, device:s}.display. The screen dimension is passed down through the figure display method. In this example, the device being used is irrelevant to the figure display method.

4.5 Add a Dimension

In one embodiment of the present invention, the code can be extended to accommodate colorblind people. In this situation, the program only needs to define a more specialized drawPixel method slot to be used when a new isColorblind dimension is present and bound to true:

```
method { rcvr ≤ screenParent, is Colorblind ≤ true }
drawPixel(x, y, c) {
    {isColorblind: false}
        .drawPixel(x, y, c.mapToGrayScale)
}
```

This code reuses the existing true coordinate as a coordinate in this new isColorblind dimension; such reuse is acceptable because the same coordinate can be used in different dimensions. Whenever drawPixel is sent to a context with a screen for the receiver and isColorblind bound to true, the new method will run instead of the old drawPixel method. It will map the color to grayscale, and then call the old method. This call invokes the old method because the original drawPixel slot's guard omitted isColorblind, which meant that it would accept any value with no restriction. The code could have used {-isColorblind} instead of {isColorblind: false} to remove the binding of that dimension from the context instead of rebinding it to false.

The new capability of colorblind usage can then be tested by evaluating code such as:
{rcvr: f1, device: s, isColorblind: true}.display 4.6 Add Another Dimension Consider now the following scenario, in which a special circumstance arises in which a user of a map of a location from the Southern Hemisphere would desire to make "South" face the top of a map. For example, a map of Australia may be flipped upside-down for certain scientific and/or novelty purposes, or simply due to preferences of the cartographer, such that "North" is at the bottom of the map and "South" is at the top of the map. This requirement is an example of another common dimension, location, which can be a key factor in mobile applications. To satisfy this requirement, the user can introduce another dimension with Boolean coordinates, such as is Aussie, but it is preferable to generalize and introduce a few coordinates to be used in a new location dimension:

def { } locationParent=newCoord;
def { } location=newCoord extending locationParent;
def { } southernHemi=newCoord extending location;
def { } australia=newCoord extending southernHemi;
def { } antarctica=newCoord extending southernHemi;

Now the code uses the location dimension in the guard of a new drawPixel slot, and applies the upside-down requirement to the entire southern hemisphere:

```
method { rcvr ≤ screenParent, location ≤ southernHemi }
drawPixel(x, y, c) {
    { -location }.drawPixel(x, -y, c)
}
```

This new code can be tested with:
{rcvr: f1, device: s, location: australia}.display
and the y coordinate is negated just as desired.
Now suppose one tests support for colorblind Australians:

```
{
    rcvr: f1, device: s,
    location: australia, isColorblind: true
}.display
```

This test fails, with an ambiguous error because two drawPixel slots match the message: the one for Australians and the colorblind one, and neither is more specific than the other. The fix is not difficult: a special-purpose slot for this case whose guard is more specific than both of the existing guards and that specifies how these cases are to be combined:

```
method {
    rcvr ≤ screenParent,
    isColorblind ≤ true,
    location ≤ southernHemi
}
drawPixel(x, y, c) {
    {-isColorblind}.drawPixel(x, y, c.mapToGrayScale);
}
```

4.7 Add a Specialization

In another embodiment of the present invention, a display for Antarctica may be specialized. That is, in Antarctica, it is often so cold that people wear goggles that may fog up, thus the image must be magnified by a factor of 2, in addition to being inverted. Exemplary code for addressing this issue is:

```
method { rcvr ≤ screenParent, location ≤ antarctica }
drawPixel(x, y, c) {
    {-location}.drawPixel(2 * x, -2 * y, c);
}
```

Then
{rcvr: f1, device: s, location: antarctica}.display
ends up invoking this method. The message
{rcvr: f1, device: s, isColorblind: true, location: antarctica}.display
illustrates the implications of our decision to allow matches in extra dimensions to trump the specificity of the matches.

Slot Lookup Specificity

The example presented in section 4.7 sheds light on a design issue for multidimensional languages such as Korz:

```
method { rcvr ≤ screenParent, location ≤ antarctica }
drawPixel(x, y, c) {
    { -location }.drawPixel(2 * x, -2 * y, c)
}
```

Consider the following case of message lookup:
{rcvr: f1, device: s, isColorblind: true, location: antarctica}.display This pseudocode determines whether the "Antarctica" features described above are to be invoked. If so, then the message lookup will cause a message such as:
{rcvr: s, isColorblind: true, location: antarctica}
to be sent with the selectors "drawPixel" and "context".

The slot guard of the drawPixel method introduced in section 4.7 is the most specific in the location dimension, but it does not mention the isColorblind dimension. On the other hand, the drawPixel method introduced at the end of section 4.6 has a guard constraining all three dimensions, but the constraint on location is looser (less specific):

```
method {
    rcvr ≤ screenParent,
    isColorblind ≤ true,
    location ≤ southernHemi
}
drawPixel(x, y, c) {
    {-isColorblind}.drawPixel(x, y, c.mapToGrayScale);
}
```

The rule that additional dimensions trump inheritance, defined above in Section 3.1.8, means that the method from section 4.6 will be invoked. Since it deals with the isColorblind dimension and then removes it before calling drawPixel again, the method in section 4.7 will end up being called with the color mapped to grayscale, yielding the correct overall result.

In another embodiment the method in section 4.6 could have dealt with and removed the location dimension instead by use of the code:

```
method {
    rcvr ≤ screenParent,
    isColorblind ≤ true,
    location ≤ southernHemi
}
drawPixel(x, y, c) {
    {-location}.drawPixel(x, -y, c);
}
```

In this case, the message above would not have been specific for the location dimension "Antarctica". In order to specify the parameters for "Antarctica", the following code is executed:

```
method {
    rcvr ≤ screenParent,
    isColorblind ≤ true,
    location ≤ antarctica
}
drawPixel(x, y, c) {
    {-location}.drawPixel(2*x, -2*y, c);
}
```

In certain scenarios, a slot that is less specific in one context may not match at all in another. Referring back to the formal definition in Section 3.1.8, for dimension binding set dbs and dimension constraint sets dcs and dcs', dbs ⊑ dcs ∧ dcs ≼ dcs' ⇏ dbs ⊑ dcs' because dcs' could have fewer dimensions but tighter constraints on some of the dimensions it does have, tight enough that dbs does not satisfy it. To address this issue, one or more rules may be implemented to share dimensions in certain predefined situations, even if the range of the shared dimensions conflict and/or extra dimensions are present.

5 ISSUES RAISED BY MULTIDIMENSIONAL IMPLICIT CONTEXT

The move from single-dispatch object-oriented programming to a multidimensional contextual paradigm raises some interesting issues, which are now discussed.

5.1 Symmetry and Subjectivity

The issues of symmetry and subjectivity in Korz can be illustrated with portions of the code for the example in Section 4 as shown in the Korz prototype IDE.

Figure 9:
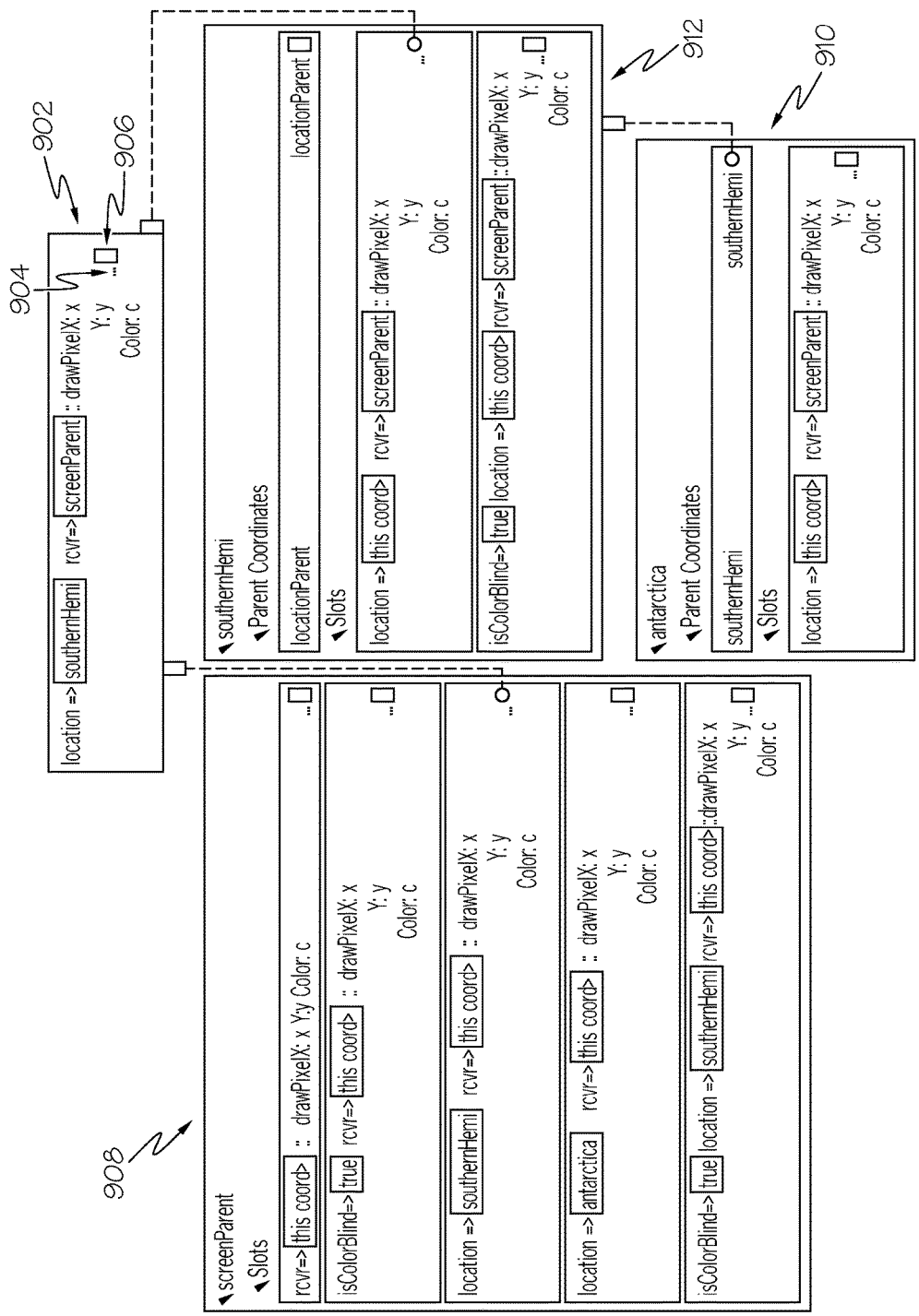
FIG. 9-FIG. 12 depict various exemplary Korz prototype IDEs.
Figure 10:
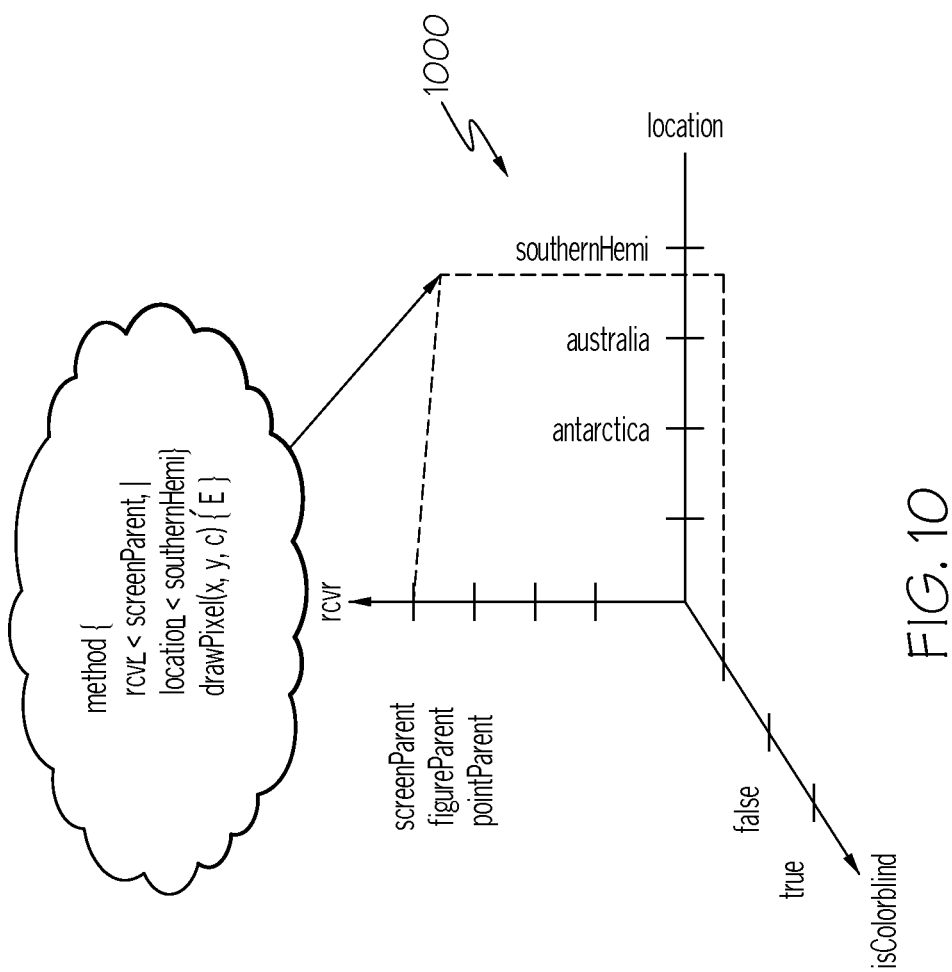

With reference now to FIG. 9, an exemplary Korz prototype IDE 900 is presented, showing in box 902 the slot method:
{rcvr≤screenParent, location≤southernHemi} drawPixel(x, y, c) { . . . }

The ellipses 904 near the right of the slot represent the method body, which can be viewed in detail by clicking the square button 906 beside them. In standard object-oriented languages, this slot would be considered as belonging to screenParent. Indeed, this slot does belong to screenParent in Korz too (in the rcvr dimension), as shown in the box 908. But this slot equally-well belongs to southernHemi (in the location dimension), as shown in the box 910. Whereas the box 902 shows an individual slot, each of the boxes 908, 910, and 912 shows a collection of slots that share a coordinate in one dimension, and can be regarded as constituting an object in Korz. Each slot in each object shows the other dimensions of variation. The buttons provided by the IDE for the coordinates in those dimensions allow navigation to views of those coordinates as objects. For example, pressing one of the buttons labeled location≤southernHemi in box 908 would show a view of southernHemi as an object, as depicted in box 912.

Thus, instead of an asymmetric organization with a dominant decomposition, in which one of the dimensions (e.g., object or class) is primary and the others (e.g., layers, aspects or subjects) are secondary, Korz's conceptual economy (i.e. no objects, no layers, just slots and coordinates) provides a symmetric organization, in which slots can be grouped into objects based on any dimensions. This notion of object is subjective. It allows slots to be gathered together into objects in ways that provide different abstractions or views, useful for different purposes. This applies to both data slots and method slots. A data slot modified via one view will manifest the new value in other views also.

The incorporation of symmetric, multidimensional, implicit context into Korz raises issues which we explore in more depth here.

Symmetry and Subjectivity

The issues of symmetry and subjectivity become clearer when one thinks in terms of the multidimensional slot space. For example, consider the graph 1000 shown in FIG. 10, which shows three dimensions of this space. Each dimension shows the coordinates that are appropriate to it, as well as a special don't-care indicator ("-"). Each slot is positioned in this space based on the coordinates specified in the dimension binding set of its slot guard. For any dimension not mentioned or not constrained in the slot guard, the don't-care position is used. The figure shows the position of the first slot depicted in box 902 in FIG. 9, whose dimension constraint set is:
{rcvr≤screenParent, location≤southernHemi}

Since isColorblind is not included in the constraint set, this slot is shown in the don't-care position for this dimension.

Figure 11:
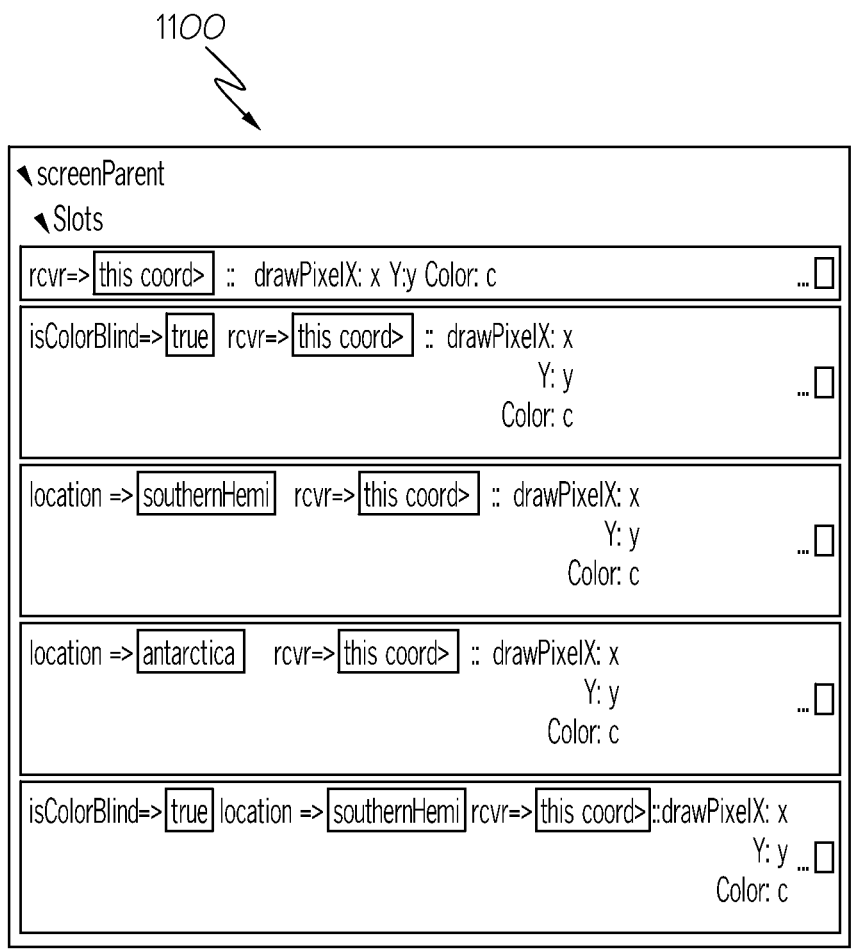
Figure 12:
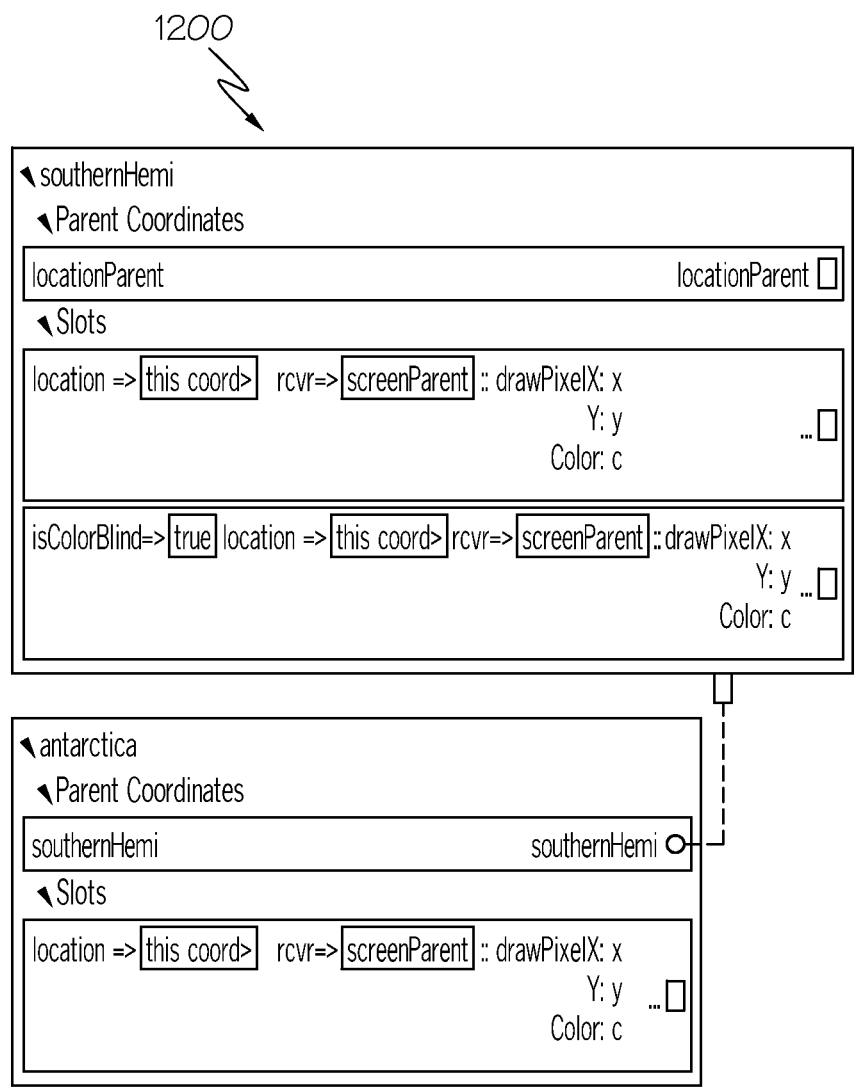

The space is symmetrical in that there is no dominant dimension that determines the program structure. Instead, the developer can have the IDE present a variety of asymmetrical, subjective views of this space that are appropriate for different purposes. For example, for working on screen display issues in general, the view of the GUI 1100 in FIG. 11 presenting screenParent as an object with all relevant slots is preferable; for focusing on support for location, a GUI 1200 such as presented in FIG. 12 presenting southernHemi and other locations as an object is optimal; and for working on accessibility and ensuring that colorblind users are well supported, a view (not depicted) presenting true as an object is optimal, ideally filtered to focus on the isColorblind dimension (since true is likely to be widely used as a coordinate). Each of these views is obtained by cutting through the slot space a different way, restricting one's view to a plane (or, in general, a region) that is relevant to one's current task. They can even be combined to both show hierarchies and to reify the slots.

The use of 'rcvr' in Korz

In Korz, a single receiver is replaced by a multidimensional context, and all dimensions are treated equally. The example in section 4.1 will now be used to examine issues raised by this feature of Korz.

A choice might be made in the example from section 4.1 to have chosen some other dimension name, perhaps graphic, to indicate that it deals with a graphic object. Then the x slot, for example, would have been defined as:
var {graphic≤point} x.

This raises two issues, however. The first has to do with methods like copy, built-in or library methods that apply broadly. Such a method must use some dimension for the implicit parameter it operates on (such a parameter would be the receiver in object-oriented languages), and since the possibilities for such a parameter are so broad and generic, a domain-specific dimension name like graphic would not suit.

A dimension name such as object, entity, or thing or the like could be used, but this could lead to confusion between coordinates and objects, and also present the implication that objects occur in only one particular dimension. Another possibility might be id or identity, but all coordinates in all dimensions are identities. So an optimal choice is rcvr, to be suggestive of the object-oriented receiver.

One solution would be to define methods like "copy" as global methods that take an explicit parameter: Instead of method {rcvr} copy( ) { . . . } define method { } copy(x)

{ . . . }. This approach breaks down, however, for methods associated with abstractions like collections, where the use of explicit parameters becomes clumsy and counter to expectations from object-oriented programmers. In such cases, other appropriate dimensions such as "collection" would be used rather than rcvr.

That leads to the second issue: the need to switch between dimensions, and its impact on syntactic sugaring. Suppose the graphic dimension had been used as suggested earlier. The makeAPoint method would now have to be written:

```
method { } makeAPoint(x, y, c) {
    var x, y, c, p;
    p = point.copy;
    {graphic: p}.x = x; {graphic: p}.y = y; {graphic: p }.color = c;
    return p;
}
```

This presents the potential of confusing code, which gets much worse in the case of cascaded expressions. The syntactic sugaring allows one to write p.x=x and so on instead, which is much clearer, and does exactly what an object-oriented programmer would expect. This sugaring, of course, relies on its being clear what dimension is involved. In one implementation of Korz, that dimension is always assumed to be rcvr, and this is the one respect in which rcvr is treated specially. Thus, a preferred construct would allow the programmer to specify the dimension to use, which would allow makeAPoint to be written something like:

```
with implied dimension = graphic {
    method { } makeAPoint(x, y, c) {
        var x, y, c, p;
        p = {rcvr: poin}. copy;
        p.x = x; p.y = y; p.color = c;
        return p;
    }
}
```

6. ADVANTAGES TO PROGRAMMING WITH KORZ

Slot space versus object model: Traditional object-oriented programmers, when wanting an overall understanding of a program, think in terms of an object model, in which the inheritance hierarchy plays a key role in organization and overall understanding. In Korz, the multidimensional slot space assumes this role. Multidimensional spaces are conceptually simple and regular, but quickly become large and hence complex in detail. Sophisticated IDE support is critical to working with them effectively. Since many object-oriented programs actually deal with multiple dimensions of variation, Korz's paradigm, along with a suitable environment, may well actually ease the task of working with such programs.

Modularity: Dimensions provide a flexible and powerful modularization mechanism that can be used for program organization and presentation. A module can be represented by a specific dimension, or a coordinate within a specific dimension. Static analysis and programmer assistance: The dimensions and coordinates in the slot space provide valuable structural information to users, and can be used by an IDE for intelligent code completion in slot guards and dimension binding modifiers. Though Korz is not statically typed, the constraints in slot guards provide a good deal of information that might be used for type, and hence for intelligent code completion as well.

Slot Space Versus Object Model

In Korz, multidimensional slot space assumes the role of organizing objects using coordinates. Coordinates can have parents, so each dimension effectively has an inheritance hierarchy. This overall view, which is imparted by visualizations such as the one shown in FIG. 10, identifies the domain of the program, and indicates what combinations of cases are being considered. To some extent, it serves as an interface. For example, when coding a drawPixel(x, y, color) message send, the structure of the space indicates what options are potentially available, and views that show how the space is populated indicate what options are actually available. Such views can be dynamically produced by the IDE.

Any slot whose coordinate in this dimension is true already supports a particular parameter, such as color blindness, and any slot whose coordinate is explicitly false presumably provides behavior suitable for people who can distinguish colors. The slots in the don't-care position in this dimension are worthy of examination. The developer can look at each and decide whether color blindness is relevant or not, and act accordingly. Analysis performed by the IDE could help, for example to identify selectors that have no methods with isColorBlind≤true yet are related, according to some metric, to slots that do. The fact that the slot space makes these choices manifest leads to thoughts of such analyses, and can be expected to facilitate their implementation.

Multidimensional spaces are conceptually simple and regular, but quickly become large and hence complex in detail. This leads to concern that they will confuse rather than help programmers. Certainly sophisticated IDE support is useful when working with them effectively. However, they do not introduce complexity; rather, they manifest inherent complexity. A simple program that does not deal with many areas of variation will have a simple space with few dimensions, perhaps even none. As areas of variation arise, as they invariably do in real life programming (and real life in general), more complex structures and dependencies are inevitable, and often the dependencies are somewhat ad hoc, because only immediately-needed cases are considered. In most programs, these dependencies are hidden in the code and are easy to miss, or worse, hidden in requirements or design documentation and never explicitly referenced in the code. This makes it difficult to amass the knowledge of the program needed for evolution tasks, and makes all but the simplest evolution tasks dangerous, because it is easy to miss something. The multidimensional structure of Korz make more of the inherent structural complexity and dependencies manifest, and encourages regularity. Static analysis and programmer assistance Korz allows a simple analysis of the slot space to reveal the dimension names, and the sets of coordinates actually used in each dimension at any point in time. The results of this analysis can be used to provide intelligent code completion in slot guards and message sends.

The present invention thus implements a new programming paradigm called "Korz". Korz generalizes object-oriented programming from one (usually implicit) receiver to many (usually implicit) "receivers", each playing a named role when a slot is looked up for a message send. Consequently, rather than a Korz system being a collection of objects, at the most fundamental level it consists of a collection of slots, each bound to some set of coordinates. Each slot, rather than being included in an object, is linked to one or more coordinates (each assigned to a named role or dimension), by its slot guard. Each coordinate, rather than containing slots, is merely a point of identity with links to the related slots in appropriate roles. When a message is sent, it has a context consisting of a set of coordinates, each in a named role. The dispatch mechanism selects the most specific slot and runs it.

Although Korz's multidimensional collection of slots captures more organizational information than a unidimensional set of objects, it can often be helpful to view a system as a simple set of objects. If one freezes all but one dimension thus allowing only one dimension to vary, the collection of slots takes on the structure of an object-oriented system, isomorphic to objects containing slots. However, rebinding one of the frozen dimensions to a different coordinate will change the contents and identities of the "objects" in the system. In one or more embodiments and as described herein, Korz combines a relatively small number of concepts: multiple dispatch, implicit, symmetric, named arguments, and slots with unified state and behavior as the fundamental particle. This combination yields more than the sum of the parts. Multiple dispatch supports multiple dimensions of variation, implicit arguments support evolution and contextual programming, and the slot-based metaphor allows for subjective gathering of slots into different "objects" for different situations. Together, they allow a program to be easily extended to accommodate new kinds of variation and new perspectives.

The present invention describes features of Korz that allow the process of slot selection to be performed centrally. This allows for optimization, by an algorithm that has a central view of the execution, and hence is able to be more effective.

The present invention describes features of Korz that make explicit the details and structure of multi-dimensional decisions and dependencies, allowing them to be analyzed and visualized, leading to reduced errors during execution. The regular multi-dimensional spatial structure of Korz exposes these details and dependencies so that they can be analyzed and visualized to reduce errors.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for optimizing object execution in context-oriented programming, the method comprising:

defining, by one or more processors, multiple slots, wherein each of the multiple slots is a container for information, wherein the information contained in one or more of the multiple slots comprises a coordinate, wherein the coordinate is a value that serves as an identity of a dimension, wherein the dimension is a description that describes attributes of an entity that is affected by the multiple slots, wherein each of the multiple slots is organized in a space in multiple dimensions such that each dimension describes a particular slot's position in the space, and wherein the multiple dimensions are greater than two dimensions;

defining, by one or more processors, a coordinate tuple for each of the multiple slots, wherein the coordinate tuple describes a position of a slot along multiple dimensions in a slot space, wherein the multiple dimensions describe roles for executing a software object, wherein each of the multiple dimensions has a same level of primacy such that no dimension has primacy over another dimension in the slot space, wherein each of the multiple dimensions comprises at least one condition that must be met during execution of the software object, wherein the slot space is represented as a three-dimensional object, and wherein each of the multiple dimensions in the slot space is represented by a sub-component that represents multiple roles in the three-dimensional object;

populating, by one or more processors, multiple method slots with software method objects that address different contexts and purposes as defined by coordinate tuples of the multiple method slots;

defining, by one or more processors, a context and purpose of a computation, wherein the context of the computation is a dimension binding set that describes the multiple slots and that is passed implicitly with invocations of the computation, and wherein the purpose of the computation describes an intended use of the computation;

retrieving and executing, by one or more processors, one or more particular software method objects from the multiple method slots, wherein said one or more particular software method objects are located at coordinate tuples in the slot space that are determined to be a match for the defined context and purpose of the computation; and propagating implicitly, by one or more processors, the context and purpose of the computation to a processor that is executing a particular software method object, wherein the particular software method object is able to call nested methods, wherein the context and purpose of the computation is propagated to the nested methods, and wherein the context and purpose of the computation determines a selection of nested method executions.

2. The method of claim 1, further comprising:
defining, by one or more processors, a first role that corresponds to a concept of receiver in standard object-oriented languages, wherein the first role is described by one of the multiple dimensions in the slot space, and wherein the first role describes a receiver object that owns a method that is called by the software object.

3. The method of claim 2, further comprising:
defining, by one or more processors, a second role as a description of a level of assertion checking to be performed when executing the software object, wherein the second role is described by one of the multiple dimensions in the slot space, and wherein a dimension of a role assertion defines conditions that must be met during execution of the software object.

4. The method of claim 1, further comprising:
defining, by one or more processors, a role as a version of code that is to be used when executing the software object, wherein the role is described by one of the multiple dimensions in the slot space.

5. The method of claim 1, further comprising:
defining, by one or more processors, a role as a particular user on whose behalf the software object is to be executed, wherein the role is described by one of the multiple dimensions in the slot space.

6. The method of claim 1, wherein the software object is an executable software method.

7. The method of claim 1, further comprising:
populating, by one or more processors, a data slot in the slot space with a data object, wherein the data slot has a data coordinate tuple in the slot space; and
retrieving, by one or more processors, the data object from the data slot at a position described by the data coordinate tuple in the slot space.

8. The method of claim 1, further comprising:
defining, by one or more processors, the context and purpose of the computation according to the coordinate tuple, wherein content of the coordinate tuple represents the context and purpose of the computation.

9. A computer program product for optimizing object execution in context-oriented programming, the computer program product comprising a computer readable storage medium having program code embodied therewith, wherein the computer readable storage medium is not a transitory signal per se, and wherein the program code is readable and executable by a processor to perform a method comprising:
defining multiple slots, wherein each of the multiple slots is a container for information, wherein the information contained in one or more of the multiple slots is a coordinate, wherein the coordinate is an immutable value that serves as an identity of a dimension, wherein the dimension is a description that describes attributes of an entity that is affected by the multiple slots, wherein each of the multiple slots is organized in a space in multiple dimensions such that each dimension describes a particular slot's position in the space, and wherein the multiple dimensions are greater than two dimensions;

defining a coordinate tuple for each of the multiple slots, wherein the coordinate tuple describes a position of a slot along multiple dimensions in a slot space, wherein the multiple dimensions describe roles for executing a software object, wherein each of the multiple dimensions has a same level of primacy such that no dimension has primacy over another dimension in the slot space, wherein each of the multiple dimensions comprises at least one condition that must be met during execution of the software object, wherein the slot space is represented as a three-dimensional object, and wherein each of the multiple dimensions in the slot space is represented by a sub-component that represents multiple roles in the three-dimensional object;

populating multiple method slots with software method objects that address different contexts and purposes as defined by coordinate tuples of the multiple method slots;

defining a context and purpose of a computation, wherein the context of the computation is a dimension binding set that describes the multiple slots and that is passed implicitly with invocations of the computation, and wherein the purpose of the computation describes an intended use of the computation;

retrieving and executing one or more particular software method objects from the multiple method slots, wherein said one or more particular software method objects are located at coordinate tuples in the slot space that are determined to be a match for the defined context and purpose of the computation; and propagating implicitly the context and purpose of the computation to a processor that is executing a particular software method object, wherein the particular software method object is able to call nested methods, wherein the context and purpose of the computation is propagated to the nested methods, and wherein the context and purpose of the computation determines a selection of nested method executions, wherein each of the multiple method slots is bound to a set of coordinates, and wherein each of the set of coordinates is assigned to a named role.

10. The computer program product of claim 9, wherein the method further comprises:
defining a role as a description of a level of assertion checking to be performed when executing the software object.

11. The computer program product of claim 9, wherein the method further comprises:
defining a role as a version of code that is to be used when executing the software object.

12. The method of claim 1, wherein each of the multiple slots includes a slot guard that selectively controls access to a particular slot by a specific message, wherein the slot guard specifies conditions for the particular slot to match the specific message based on a dimension of the particular slot, wherein the slot guard specifies a desired action of the specific message, and wherein the slot guard specifies parameters that must be provided as part of the specific message.

13. The method of claim 3, further comprising:
defining, by one or more processors, a third role as a level of verbosity when logging operations during execution of the software object, wherein the level of verbosity describes a quantity of logging that occurs during execution of the computation, wherein the third role is described by one of the multiple dimensions in the slot space, wherein the slot space is represented as a cube that comprises a sub-cube, and wherein the sub-cube represents the first role, the second role, and the third role.

14. The computer program product of claim 9, wherein the method further comprises:
populating a data slot in the slot space with a data object, wherein the data slot has a data coordinate tuple in the slot space; and
retrieving the data object from the data slot at a position described by the data coordinate tuple in the slot space.

15. A computer system comprising:
a processor, a computer readable memory, and a computer readable storage medium;
first program instructions to define multiple slots, wherein each of the multiple slots is a container for information, wherein the information contained in one or more of the multiple slots is a coordinate, wherein the coordinate is an immutable value that serves as an identity of a dimension, wherein the dimension is a description that describes attributes of an entity that is affected by the multiple slots, wherein each of the multiple slots is organized in a space in multiple dimensions such that each dimension describes a particular slot's position in the space, and wherein the multiple dimensions are greater than two dimensions;
second program instructions to define a coordinate tuple for each of the multiple slots, wherein the coordinate tuple describes a position of a slot along multiple dimensions in a slot space, wherein the multiple dimensions describe roles for executing a software object, wherein each of the multiple dimensions has a same level of primacy such that no dimension has primacy over another dimension in the slot space, wherein each of the multiple dimensions comprises at least one condition that must be met during execution of the software object, wherein the slot space is represented as a three-dimensional object, and wherein each of the multiple dimensions in the slot space is represented by a sub-component that represents multiple roles in the three-dimensional object;
third program instructions to populate multiple method slots with software method objects that address different contexts and purposes as defined by coordinate tuples of the multiple method slots;
fourth program instructions to define a context and purpose of a computation, wherein the context of the computation is a dimension binding set that describes the multiple slots and that is passed implicitly with invocations of the computation, and wherein the purpose of the computation describes an intended use of the computation;
fifth program instructions to retrieve and execute one or more particular software method objects from the multiple method slots, wherein said one or more particular software method objects are located at coordinate tuples in the slot space that are determined to be a match for the defined context and purpose of the computation;
sixth program instructions to propagate implicitly the context and purpose of the computation to a processor that is executing a particular software method object, wherein the particular software method object is able to call nested methods, wherein the context and purpose of the computation is propagated to the nested methods, wherein the context and purpose of the computation determines a selection of nested method executions, wherein each of the multiple method slots is bound to a set of coordinates, and wherein each of the set of coordinates is assigned to a named role; and wherein the first, second, third, fourth, fifth, and sixth program instructions are stored on the computer readable storage medium for execution by the processor via the computer readable memory.

16. The computer system of claim 15, further comprising:
seventh program instructions to define a role as a description of a level of assertion checking to be performed when executing the software object; and wherein
the seventh program instructions are stored on the computer readable storage medium for execution by the processor via the computer readable memory.

17. The computer system of claim 15, further comprising:
seventh program instructions to define a role as a version of code that is to be used when executing the software object; and wherein
the seventh program instructions are stored on the computer readable storage medium for execution by the processor via the computer readable memory.

18. The computer system of claim 15, further comprising:
seventh program instructions to define a role as a particular user on whose behalf the software object is to be executed; and wherein
the seventh program instructions are stored on the computer readable storage medium for execution by the processor via the computer readable memory.

19. The computer system of claim 15, wherein the software object is an executable software method.

20. The computer system of claim 15, further comprising:
seventh program instructions to populate a data slot in the slot space with a data object, wherein the data slot has a data coordinate tuple in the slot space; and
eighth program instructions to retrieve the data object from the data slot at a position described by the data coordinate tuple in the slot space; and wherein
the seventh and eighth program instructions are stored on the computer readable storage medium for execution by the processor via the computer readable memory.

* * * * *